United States Patent
Soliman et al.

(10) Patent No.: US 8,955,088 B2
(45) Date of Patent: Feb. 10, 2015

(54) FIREWALL CONTROL FOR PUBLIC ACCESS NETWORKS

(75) Inventors: Hesham Soliman, Endeavour Hills (AU); Gregory Ian Daley, Camberwell (AU)

(73) Assignee: Futurewei Technologies, Inc., Plano, TX (US)

( * ) Notice: Subject to any disclaimer, the term of this patent is extended or adjusted under 35 U.S.C. 154(b) by 1594 days.

(21) Appl. No.: 12/266,455

(22) Filed: Nov. 6, 2008

(65) Prior Publication Data

US 2009/0119770 A1  May 7, 2009

Related U.S. Application Data

(60) Provisional application No. 60/986,220, filed on Nov. 7, 2007.

(51) Int. Cl.
*G06F 15/16* (2006.01)
*H04L 29/06* (2006.01)

(52) U.S. Cl.
CPC .............. *H04L 63/20* (2013.01); *H04L 63/02* (2013.01)
USPC ........................................... 726/11

(58) Field of Classification Search
USPC ........................................... 726/11
See application file for complete search history.

(56) References Cited

U.S. PATENT DOCUMENTS 7,592,906 B1 * 9/2009 Hanna et al. .................. 340/506
7,849,495 B1 * 12/2010 Huang et al. .................... 726/1
2002/0023210 A1 * 2/2002 Tuomenoksa et al. ........ 713/161
2003/0131116 A1 * 7/2003 Jain et al. ...................... 709/230
2005/0005165 A1 * 1/2005 Morgan et al. ................ 713/201
2005/0027837 A1 * 2/2005 Roese et al. .................. 709/223
2007/0294755 A1 * 12/2007 Dadhia et al. ................... 726/11

FOREIGN PATENT DOCUMENTS

| EP | 1802023 A1 | 6/2007 |
| WO | 2005009003 A1 | 1/2005 |
| WO | 2006108436 A1 | 10/2006 |

OTHER PUBLICATIONS

Foreign Communication From a Related Counterpart Application—International Search Report and Written Opinion, PCT/CN2008/072986, Feb. 19, 2009, 11 pages.

Arkko, J., et al., "Secure Neighbor Discovery (SEND)," IETF Network Working Group, RFC 3971, Mar. 2005, 53 pgs.

(Continued)

*Primary Examiner* — Esther B Henderson
(74) *Attorney, Agent, or Firm* — Conley Rose, P.C.; Grant Rodolph; Brandt D. Howell

(57) ABSTRACT

An apparatus comprising a policy enforcement point (PEP) configured to enforce firewall policies in a network, and a policy decision point (PDP) coupled to the PEP and configured to manage the PEP based on at least one firewall policy option received from at least one node. Also disclosed is a network component comprising at least one processor configured to implement a method comprising receiving a request from a node regarding a firewall policy entry, authenticating the node, processing the request to manage a firewall using a firewall control protocol, and sending a reply to the node regarding processing the request. Also disclosed is a method comprising signaling a PDP to establish a session associated with a source address and a requested protocol, and receiving an indication when the session is allowed.

21 Claims, 20 Drawing Sheets

(56) References Cited

OTHER PUBLICATIONS

Aura, T., "Cryptographically Generated Addresses (CGA)," IETF Network Working Group, RFC 3972, Mar. 2005, 21 pgs.
Bradner, S., "Key Words for Use in RFCs to Indicate Requirement Levels," IETF Network Working Group, RFC 2119, Mar. 1997, 3 pgs.
Deering, S, et al., "Internet Protocol, Version 6 (IPv6) Specification," IETF Network Working Group, RFC 2460, Dec. 1998, 37 pgs.
Deering, S, et al., "Multicast Listener Discovery (MLD) for IPv6," IETF Network Working Group, RFC 2710, Oct. 1999, 21 pgs.
Devarapalli, V., et al., "Network Mobility (NEMO) Basic Support Protocol," IETF Network Working Group, RFC 3963, Jan. 2005, 31 pgs.
Hinden, R., et al., "IP Version 6 Addressing Architecture," IETF Network Working Group, RFC 4291, Feb. 2006, 24 pgs.
Johnson, D., et al., "Mobility Support in IPv6," IETF Network Working Group, RFC 3775, Jun. 2004, 155 pgs.
Levkowetz, H., et al., "Mobile IP Traversal of Network Address Translation (NAT) Devices," IETF Network Working Group, RFC 3519, Apr. 2003, 32 pgs.
Narten, T., et al., "Guidelines for Writing an IANA Considerations Section in RFCs," IETF Network Working Group, RFC 2434, Oct. 1998, 11 pgs.
Narten, T., et al., "Neighbor Discovery for IP version 6 (IPv6)," IETF Network Working Group, RFC 4861, Sep. 2007, 91 pgs.
Nordmark, E., et al., "Basic Transition Mechanisms for IPv6 Hosts and Routers," IETF Network Working Group, RFC 4213, Oct. 2005, 26 pgs.
Montenegro, G., "Reverse Tunneling for Mobile IP, revised," IETF Network Working Group, RFC 3024, Jan. 2001, 28 pgs.
Perkins, C., "IP Mobility Support for IPv4," IETF Network Working Group, RFC 3344, Aug. 2002, 93 pgs.
Stiemerling, M., et al., "NAT/Firewall NSIS Signaling Layer Protocol (NSLP)," NSIS Working Group, Internet-Draft, draft-ietf-nsis-nslp-natfw-15.txt, Jul. 9, 2007, 83 pgs.
Thomson, S., et al., "IPv6 Stateless Address Autoconfiguration," IETF Network Working Group, RFC 4862, Sep. 2007, 28 pgs.
Vida, R., et al., "Multicast Listener Discovery Version 2 (MLDv2) for IPv6," IETF Network Working Group, RFC 3810, Jun. 2004, 58 pgs.

* cited by examiner

FIREWALL CONTROL FOR PUBLIC ACCESS NETWORKS

CROSS-REFERENCE TO RELATED APPLICATIONS

The present application claims priority to U.S. Provisional Patent Application No. 60/986,220 filed Nov. 7, 2007 by Hesham Soliman, et al. and entitled, "Firewall Control for Public Access Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Today's network protection includes the use of firewalls, which comprise a plurality of configurations that limit the traffic coming into or out of the network. Such configurations are typically set by an administrator or an operator. The administrator's configurations may be substantially static and affect all users within the network. Firewalls that comprise such configurations are to some degree effective in providing protection and are widely used in networks. However, such firewalls may comprise some configurations, which do not satisfy all the network users or subscribers. For instance, a firewall does not satisfy a user that needs to access a specific application, when its configurations do not allow access to that application. Further, the firewall may require each user to initiate connections, for example using specific application proxies for signaling, to communicate with other users, which is not suitable for a user that needs to be reachable without initiating a connection.

Further, firewalls may be configured for a network where the local components or nodes within the network are trusted, while other components or nodes outside the network, including users, other networks, or other network components, are not trusted. Such firewalls are not effective for network protection where users' activities within the network are not limited or restricted, such as in a public network. Furthermore, such firewalls are not effective for network protection where some anonymous or incompetent users should not be trusted.

SUMMARY

In one embodiment, the disclosure includes an apparatus comprising a policy enforcement point (PEP) configured to enforce firewall policies in a network, and a policy decision point (PDP) coupled to the PEP and configured to manage the PEP based on at least one firewall policy option received from at least one node.

In another embodiment, the disclosure includes a network component comprising at least one processor configured to implement a method comprising receiving a request from a node regarding a firewall policy entry, authenticating the node, processing the request to manage a firewall using a firewall control protocol, and sending a reply to the node regarding processing the request.

In yet another embodiment, the disclosure includes a method comprising signaling a PDP to establish a session associated with a source address and a requested protocol, and receiving an indication when the session is allowed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for enabling a plurality of nodes to send their corresponding network preferences or options to a firewall in a network, such as a public network. Specifically, the nodes may send their preferences or options to a PDP, which may manage or control the firewall in the network. The firewall and the PDP may be located at different nodes or may be located at the same node. The firewall may provide network protection for each node based on the node's preferences or options, which may make the communications in the network more flexible. The firewall, the PDP, or both may be located at the edge of the network, for instance at an access router, and may communicate with a reduced number of nodes or users, which may reduce bottlenecks in the network.

Figure 1:
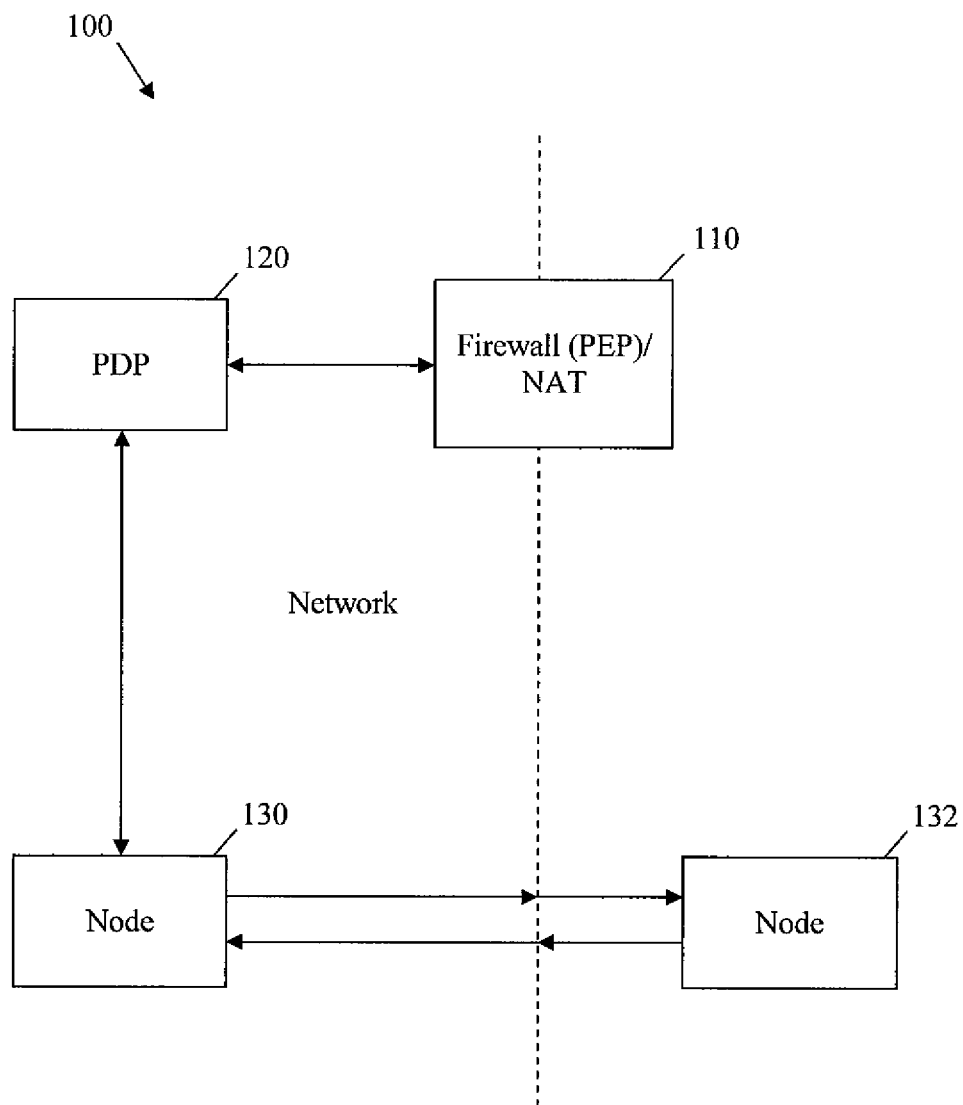
FIG. 1 is a schematic diagram of an embodiment of a firewall communication architecture.

FIG. 1 illustrates one embodiment of a firewall communication architecture 100, which may be implemented in a network, such as a public network. The firewall communication architecture 100 may include a firewall 110, a PDP 120, a first node 130, and a second node 132. The firewall 110, and similarly the PDP 120, may be an application or a plurality of applications installed on a server in the network. In an embodiment, the firewall 110 and the PDP 120 may be located on separate servers, nodes, or other network components, as shown in FIG. 1. The firewall 110 may be located at the edge of the network, for instance at an access router or edge bridge, and the PDP 120 may be located in the network or at the core of the network, for instance at a core bridge, as shown in FIG. 1. In other embodiments, the firewall 110, the PDP 120, or both may be located at the edge of the network or at the core of the network. Further, the firewall 110 and the PDP 120 may be located on the same server, node, or network component, such as a PEP. The firewall 110 and the PDP 120 may communicate with each other using any protocol, which may be supported by the network. For instance, the firewall 110 and the PDP 120 may exchange a plurality of messages using a PDP or PEP protocol.

The first node 130 may be an interior node, core node, edge node, or host, which may be located in the network. The second node 132 may be an exterior node, such as a gateway or a terminal or end node, which may be located outside the network and in communication with the network. The first node 130 may send a plurality of preferences or options to the PDP 120, which may be used to configure the firewall 110. For instance, the options may include a choice of applications, protocols, traffic filters, ports, other network resources, or combinations thereof. The options may be used by the firewall 110 to create, add, modify, or delete configurations or entries. Such options may have a lifetime that expires if not updated regularly. Additionally, the first node 130 may forward to the PDP 120 a plurality of options that the first node 130 received from the second node 132. The options may be sent from the second node 132 to the first node 130 using any protocol supported by the network for communications between interior and exterior nodes, such as IP. Additionally, the options may be sent or forwarded by the first node 130 to the PDP 120 using a firewall control protocol, which may be a firewall control (FCON) for public access networks protocol. For instance, the FCON protocol may include sending or forwarding a plurality of options between the first node 130 and the PDP 120 in a plurality of messages using the Internet Control Message Protocol (ICMP).

Additionally, the first node 130 may use the firewall control protocol or FCON to request an address, such as a unique Internet Protocol version 4 (IPv4) address, from the network via the PDP 120 or may forward a request for an address from the second node 132 to the PDP 120. In turn, the PDP 120 may send the request, for instance using the PDP or PEP protocol, to a server in charge of allocating network addresses, which may be a Network Address Translator (NAT). In an embodiment, the NAT and the firewall 110 may be located at the same node or may be each located at a separate node in the network. The firewall control protocol or FCON may also be used to send or forward a request to the PDP 120 for the allocation of at least one protocol, which may be used for establishing communications with the network. The PDP 120 may then forward such request to the firewall 110 or the PEP. Similarly, a request for the allocation of at least one port or port number may be forwarded from the first node 130 to the firewall 110 or the PEP. In other embodiments, the second node 132 may also be an interior node or host and may send its preferences or requests to the PDP 120 using the firewall control protocol or FCON without communicating with the first node 130.

The first node 130 or the second node 132 may obtain or discover the address of the PDP 120 before sending a request or message to the PDP 120. For instance, the first node 130 or the second node 132 may receive a message, such as a router advertisement option or a DHCP version 6 (DHCPv6) option, which may include the address of the PDP 120. Hence, the first node 130 or the second node 132 may start sending messages to the PDP 120 to request addresses from the NAT, to request the allocation of protocols and/or ports from the firewall 110 or PEP, or to send options to the firewall 110 or PEP.

In an embodiment, the PDP 120 may be in charge of authentication and authorization of the messages between the PDP 120 and the firewall 110. For instance, the PDP 120 may initiate the authentication and authorization with the firewall 110, using manual configuration of security associations, public key authentication, trusted certificate authentication, any other method allowed by a network administrator, or combinations thereof. For example, in enterprise or home networks, the message forwarded using the firewall control protocol or FCON may be authorized using a public key, such as a global Public Key Infrastructure (PKI), trusted certificates, or both. In other embodiments, the second node 132 or the first node 130 may be authorized using an address, such as a Cryptographically Generated Addresses (CGA), which may be included in the message forwarded using FCON. Accordingly, the PDP 120 may verify that the address in the message corresponds to the first node 130 or the second node 132 and that the request does not violate any network policies, which may be set by the network administrator. In some embodiments, the message may be additionally authorized using a key, which may be self generated by the first node 130 or the second node 132. When the address is verified and no violations are found, the PDP 120 may configure the firewall 110 or the PEP using the forwarded options.

In the firewall communication architecture 100, the FCON may provide some advantages over other used firewall protocols or functions. For instance, the FCON may allow incoming connections without using specific application proxies for signaling, and may provide new services without using specific application gateways, new protocols that may not be known to the firewall and would otherwise be blocked, and increased user control.

Figure 2:
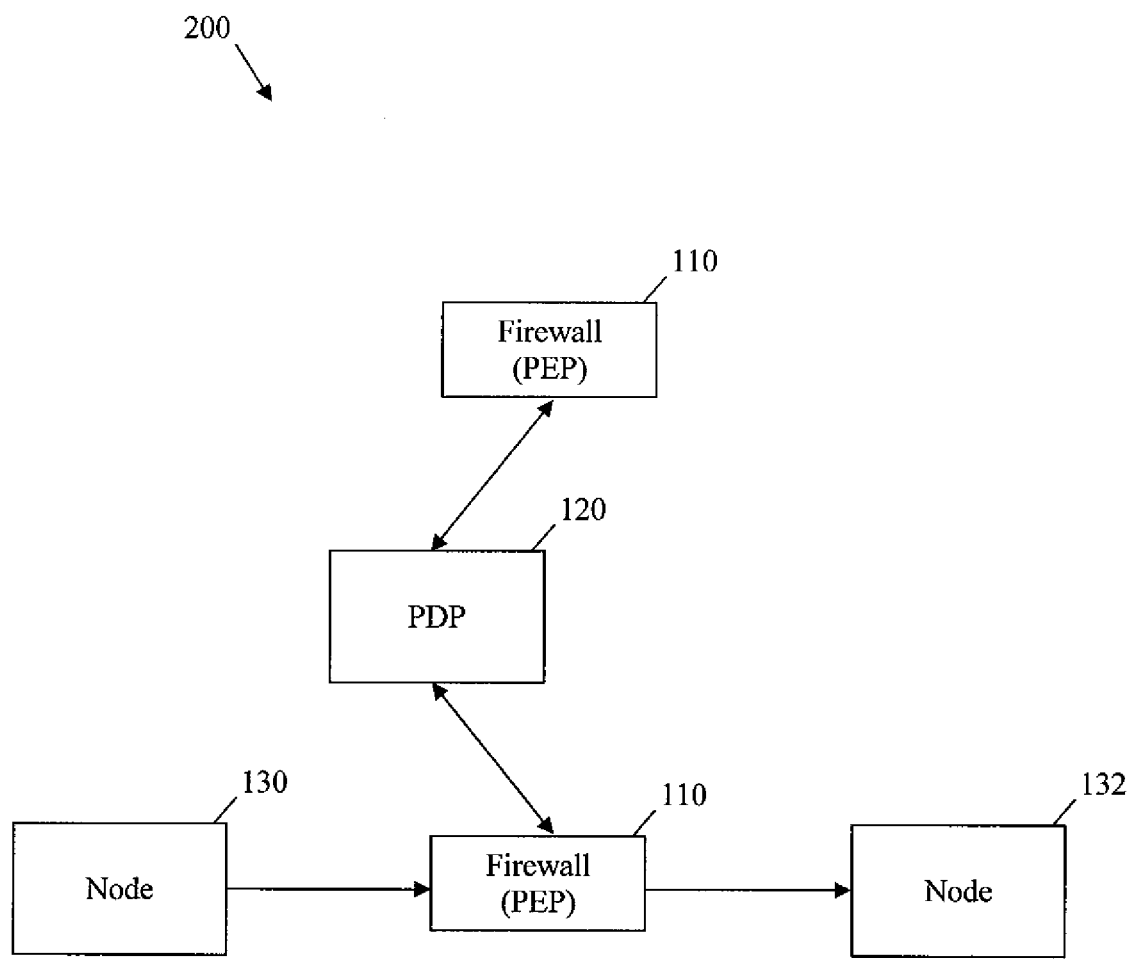
FIG. 2 is a schematic diagram of an embodiment of a firewall connection.

FIG. 2 illustrates one embodiment of a firewall connection 200, which may be established between at least some of the components of the firewall communication architecture 100 based on the other used firewall protocols or functions. As such, the PDP 120 may be a static policy decision point that sets policy, which may be substantially static for a plurality of PEPs in the network. Accordingly, a connection state may be created between the first node 130, which may be a host, and the second node 132, which may be a peer device, when the two exchange data compliant with the set policies of the PDP 120. In some embodiments, the PDP 120 and a static firewall 110 may be combined into the same entity on the same node, and the PDP 110 may use long term configuration to set policy when the connection state is created.

Figure 3:
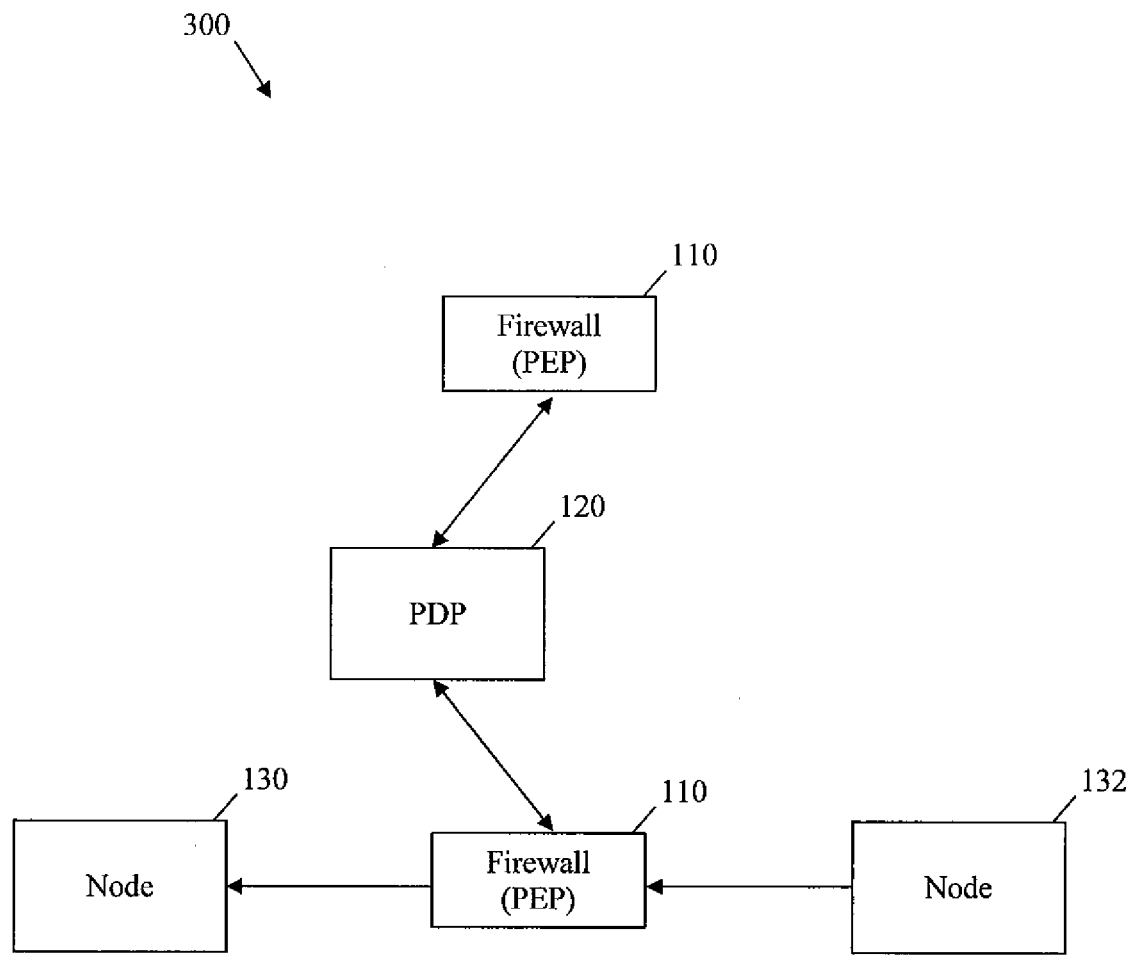
FIG. 3 is a schematic diagram of another embodiment of a firewall connection.

FIG. 3 illustrates another embodiment of a firewall connection 300, where the connection state is used for inbound packet flow, for instance when the second node 132 may be a client and the first node 130 may be a server. Accordingly, the PDP 120 may set the policy for the PEP 110 to create an inbound connection state and maintain internal network security. The inbound connection state may be available at all times, regardless of the lifetime of the server applications in use, provided that the inbound connection state does not violate any policies, for example those set by a network administrator. The second node 132 may start sending messages to the PDP 120 requesting that certain protocols or port numbers be opened for its traffic on a firewall or PEP 110. The second node 132 may also request a unique IPv4 address and one or more port numbers for NAT traversal. The entries created by the second node 132 have a lifetime associated with them, which may need to be refreshed to avoid losing them. The lifetime may be set by the PDP 120 and cached by the second node 132 using FCON.

Figure 4:
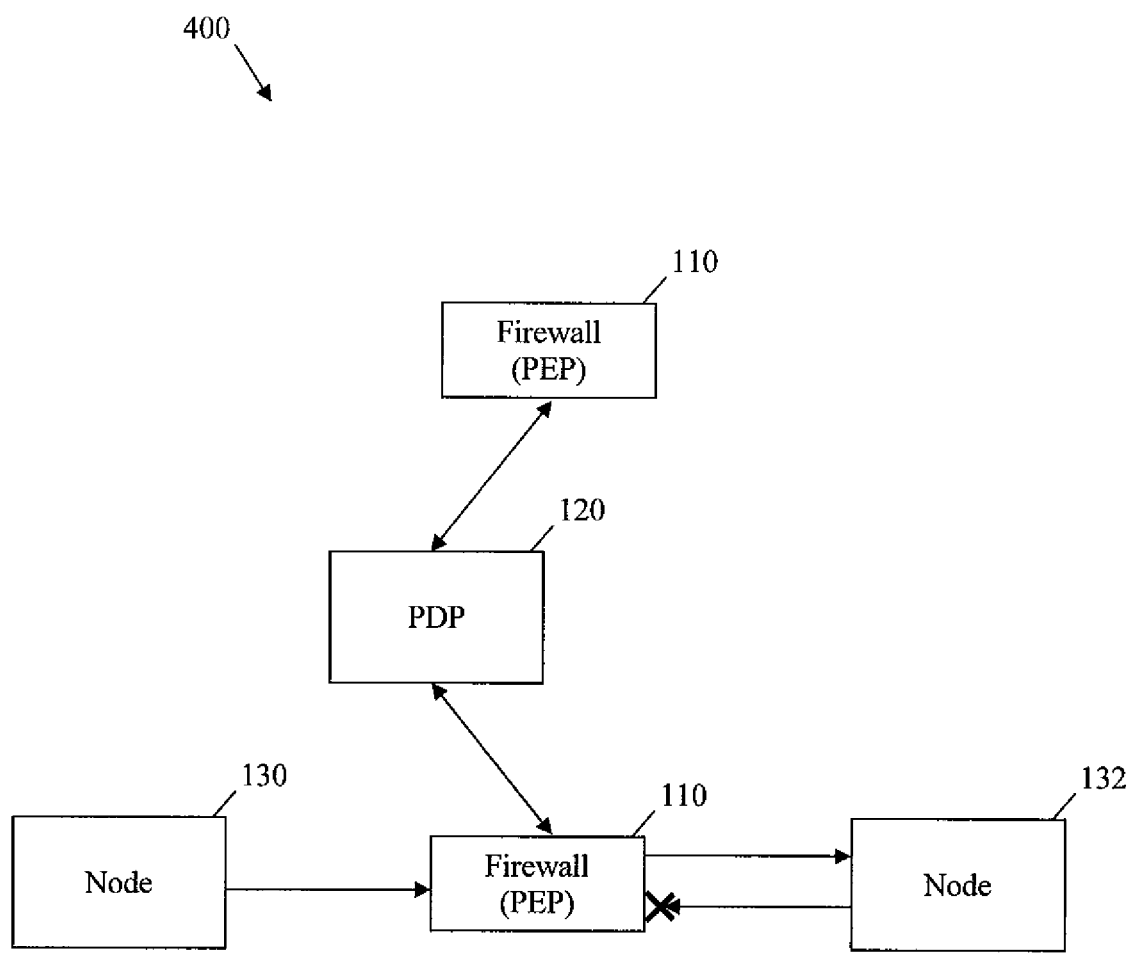
FIG. 4 is a schematic diagram of another embodiment of a firewall connection.

FIG. 4 illustrates another embodiment of a firewall connection 400 for peer-to-peer applications with dynamic source and destination addresses, for instance between the second node 132 and the first node 130. Specifically, a transport layer connection state may not be associated with the upper layer inbound connection of the peer-to-peer application Hence, inbound packets may be dropped unless the firewall 110 snoops and obtains the protocol associated with the transport layer connection state and the set policy is modified to permit such inbound connection. Alternatively, using the FCON, a peer-to-peer connection may be established by signaling, where the first node 130 or the host may inform the PDP 120 of its intention to send packets to the second node 132, for instance with a particular source and destination address, and transport profile. Hence, the policy may be set and enforced at the time the session is established, and may adapt to the needs of the network's current transmission profile.

Figure 5:
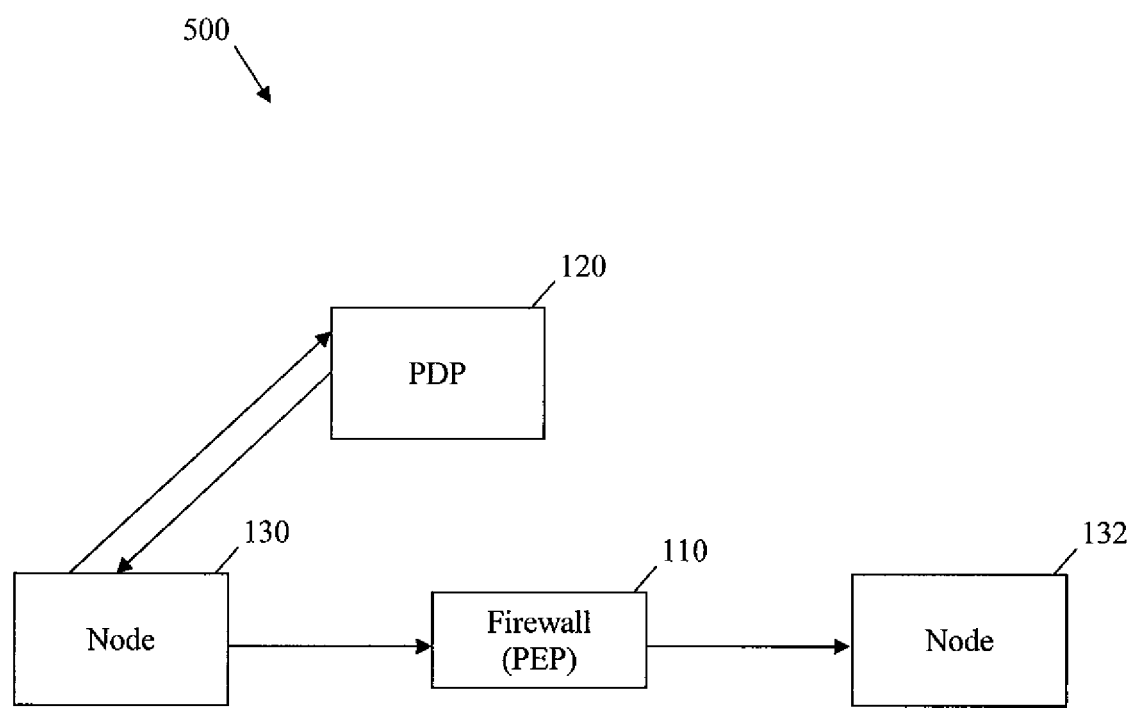
FIG. 5 is a schematic diagram of an embodiment of a PDP connection.

FIG. 5 illustrates another embodiment of a firewall connection 500 using the FCON described above. Accordingly, the first node 130 or the host may inform the PDP 120 of the protocols used or expected, for instance via network gateways, using a request message, which may be used to create a flow descriptor entry in the firewall 110. The PDP 120 may indicate whether the connection or session will be allowed, and whether the state may be created on the PEP. For instance, a response message may be sent, indicating that the connection is allowed.

Figure 6:
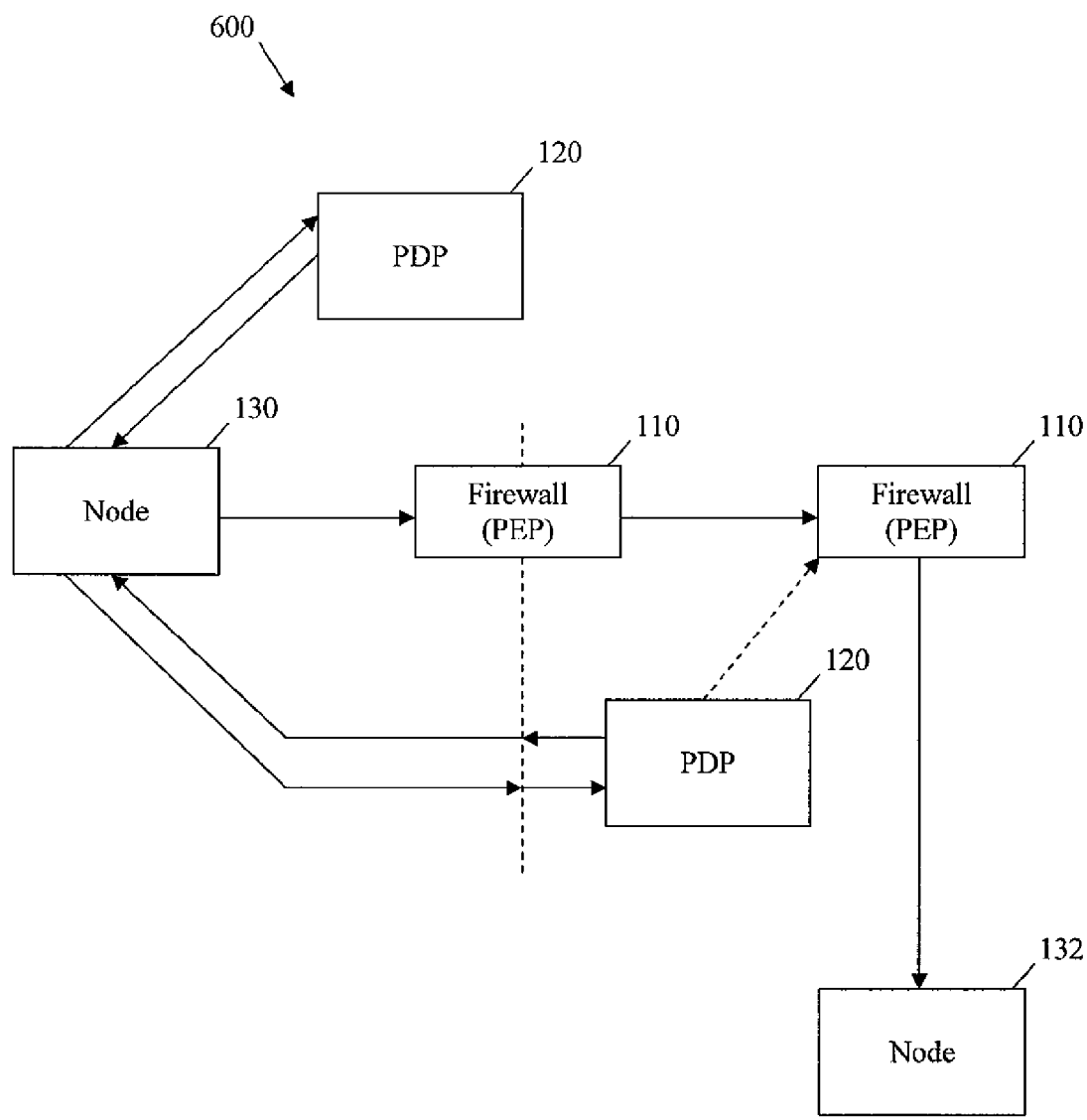
FIG. 6 is a schematic diagram of another embodiment of a PDP connection.

FIG. 6 illustrates another embodiment of a firewall connection 600 using FCON, where the PDP 120 manages a plurality of firewalls 110 or PEPs. The firewalls 110 or PEPs may be connected in series with the second node 132, which may be a destination node in another network, such as the Internet. Accordingly, the PDP 120 may forward information, such as preferences or options, to the PEPs in series using signaling. Alternatively, a plurality of PDPs 120 may forward such information to one of the PEPs using signaling. In this case, the PDPs 120 may use different trust policies, for instance when the PDPs 120 correspond to different network service providers. Further, a single PDP 120 or a plurality of PDPs 120 may use different trust policies when some of the firewalls 110 are located in a network, such as an enterprise, and the remaining firewalls 110 are located in an external network, such as a service provider network.

Figure 7:
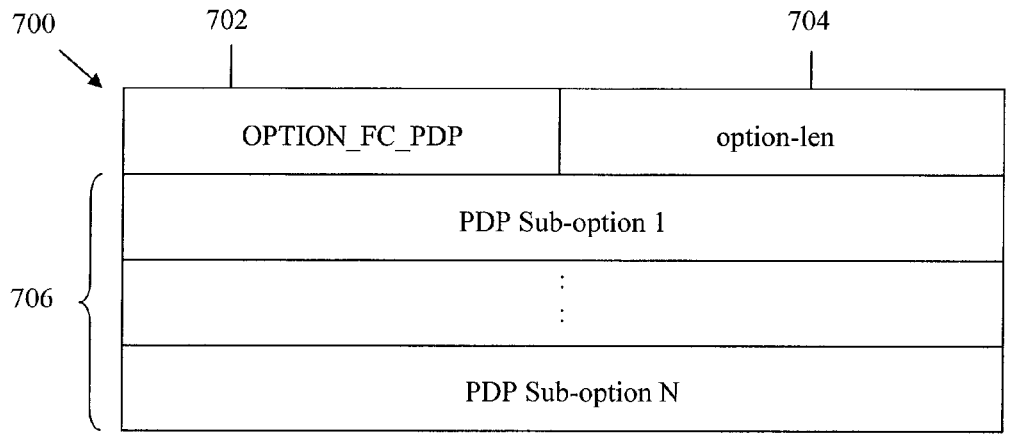
FIG. 7 is a schematic diagram of an embodiment of a Dynamic Host Configuration Protocol (DHCP) option.

FIG. 7 illustrates an embodiment of a DHCP option 700, which may be sent to a node, such as the first node 130, indicate the address of a PDP, such as the PDP 120, and include a plurality of options. The DHCP option 700 may be a DHCPv6 option and may comprise an OPTION_FC_PDP 702, an option-len 704, and a plurality of PDP Sub-options 706 (Sub-options 1, Sub-options 2, . . ., Sub-options N). The DHCP option 700 may include PDP destination coverage information for each PDP in the network, which may have control over different network ranges, for instance at different nodes or managing different firewalls. In an embodiment, the OPTION_FC_PDP 702 may be an assigned DHCP option code for PDP discovery. The option-len 704 may comprise the length of the entire option in bytes. The PDP Sub-options 706 may each comprise information corresponding to one PDP to be configured. In an embodiment, the OPTION_FC_PDP 702 and the option-len 704 may each have a length equal to about 16 bits.

Figure 8:
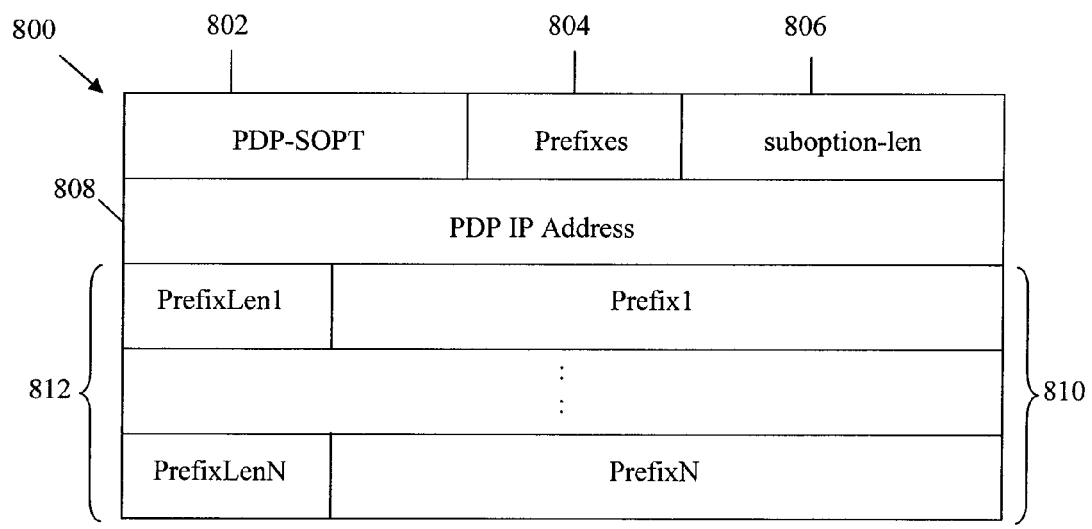
FIG. 8 is a schematic diagram of an embodiment of a DHCP sub-option.

FIG. 8 illustrates an embodiment of a DHCP sub-option 800, which may be included in the DHCP option 700 and may correspond to one PDP. The DHCP sub-option 800 may be a DHCPv6 sub-option and may comprise a PDP sub-option (PDP-SOPT) 802, a Prefixes 804, a suboption-len 806, a PDP IP Address 808, a plurality of Prefixes 810 (Prefix1, Prefix2, . . ., PrefixN) and a plurality of corresponding PrefixLens 812 (PrefixLen1, PrefixLen2, . . ., PrefixLenN). The DHCP sub-option 800 may include an address and information for the PDP. In an embodiment, the PDP-SOPT 802 may indicate a PDP sub-option type, the Prefixes 804 may comprise the number of prefixes included in the DHCP sub-option 800, the suboption-len 806 may comprise the length of the sub-option in bytes, and the PDP IP Address 808 may comprise the IP address of the PDP. Additionally, each Prefix 810 may comprise a prefix or destination controlled or managed by the PDP, and each PrefixLen 812 may comprise the length of the corresponding Prefix 810 in bits. In an embodiment, the Prefix 810 may comprise a number of bytes required to store the prefix rounded up to the nearest integer. In an embodiment, the Prefix 810 and its corresponding PrefixLen 812 may be set to zeros to indicate that the PDP is in charge of configuring or managing all destinations. In an embodiment, the PDP-SOPT 802, the Prefixes 804, the suboption-len 806, and any PrefixeLen 812 may have a length equal to about eight bits, about eight bits, about 16 bits, and about eight bits, respectively.

Figure 9:
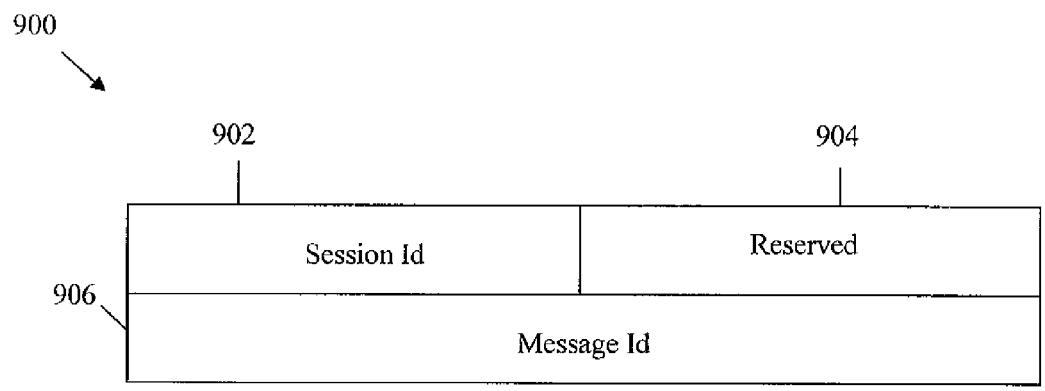
FIG. 9 is a schematic diagram of an embodiment of a request message.

FIG. 9 illustrates an embodiment of a request message 900, which may be sent to the PDP using the FCON. For instance, the FCON may use ICMP version 6 (ICMPv6) for transporting the request message, based on a request/response message exchange. The request message 900 may be sent from the host or end node to the PDP. Additionally, the request message 900 may include additional options not shown in FIG. 9 that serve different purposes. In an embodiment, the request message 900 may comprise a Session Id 902, a Reserved field 904, and a Message Id 906. The Session Id 902 may comprise a session identifier, which may be about a 16-bit integer. The session identifier may be obtained by the end node when a security association is created with the PDP. The Session Id 902 may be unique for a particular end node, which may be identified by its public key. The Reserved field 904 may be set to about zero by the sender and ignored by the receiver. The Message Id 906 may comprise a message identifier. The message identifier may be a simple counter, which may be incremented by one for every new message. The Message Id 906 may be used to match responses with their corresponding requests. Alternatively, the Message Id 906 may be set to about zero by the sender and ignored by the receiver. In an embodiment, the Session Id 902, the Reserved field 904, and the Message Id 906 may have a length equal to about 16 bits, about 16 bits, and about 32 bits, respectively.

Figure 10:
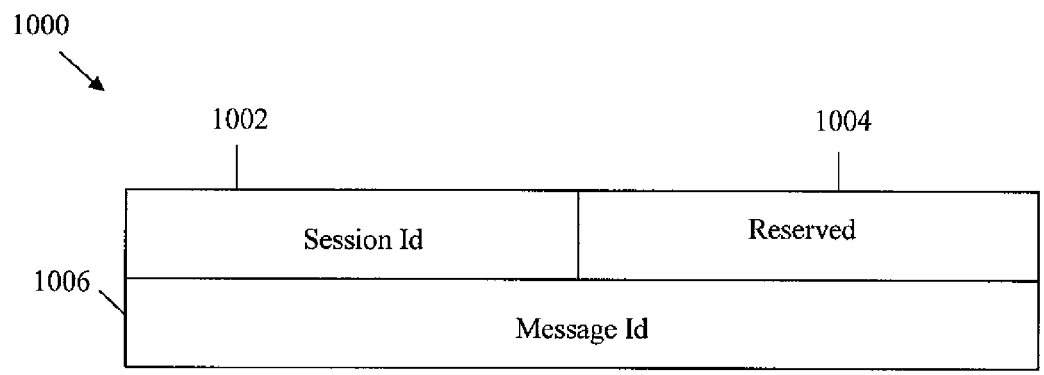
FIG. 10 is a schematic diagram of an embodiment of a response message.

FIG. 10 illustrates an embodiment of a response message 1000, which may be sent by the PDP to the end node in response to the request message 900. The response message 1000 may comprise a Session Id 1002, a Reserved field 1004, and a Message Id 1006, which may be substantially the same as the corresponding fields of the request message 900. Additionally, the response message 1000 may include different options based on the options of the request message 900. In an embodiment, the Session Id 1002, the Reserved field 1004, and the Message Id 1006 may have a length equal to about 16 bits, about 16 bits, and about 32 bits, respectively.

Figure 11:
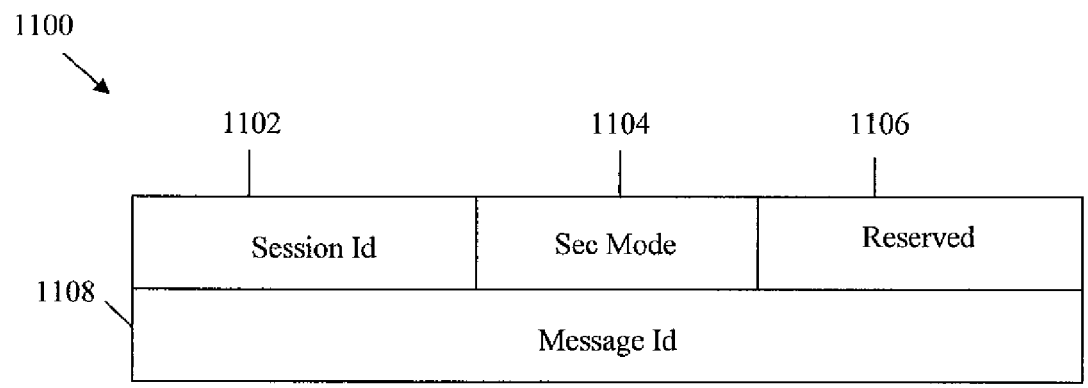
FIG. 11 is a schematic diagram of an embodiment of an initiation message.

FIG. 11 illustrates an embodiment of an initiation message 1100, which may be sent from the end node to the PDP to establish a secure association before sending further requests. The initiation message 1100 may not include information about packet flows that may require firewall configuration. Instead, the initiation message 1100 may comprise the end node's security credentials and a challenge for the PDP. In an embodiment, the initiation message 1100 may comprise a Session Id 1102, a Sec Mode 1104, a Reserved field 1106, and a Message Id 1108. The Session Id 1102, the Reserved field 1106, and the Message Id 1108 may be configured substantially similar to the corresponding fields of the request message 900. The Sec Mode 1104 may indicate the type of credentials used to establish the secure association. For instance, the Sec Mode 1104 may have a value of about one to indicate the use of self-generated public keys or a value of about two to indicate the use of trusted certificates, which are either signed by the same administrative authority or a trusted third party. In an embodiment, the Session Id 1102, the Sec Mode 1104, the Reserved field 1106, and the Message Id 1108 may have a length equal to about 16 bits, about eight bits, about eight bits, and about 32 bits, respectively.

Figure 12:
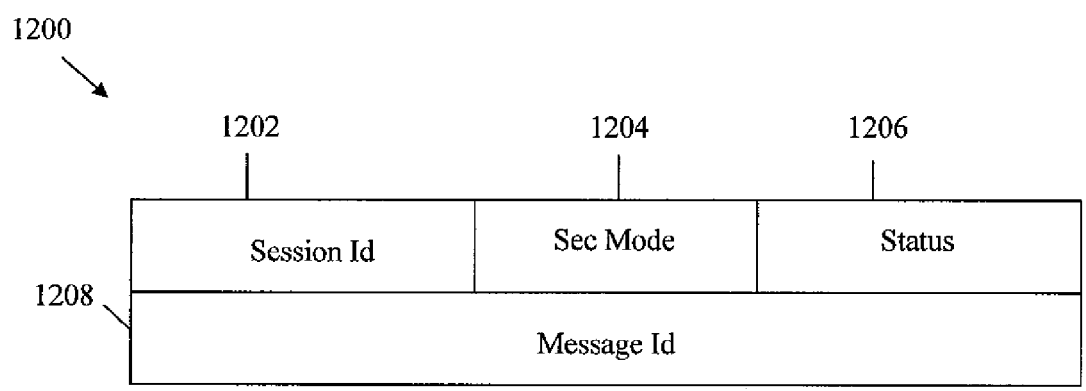
FIG. 12 is a schematic diagram of an embodiment of an initiation acknowledgement message.

FIG. 12 illustrates an embodiment of an initiation acknowledgement message 1200, which may be sent from the PDP to the end node in response to the initiation message 1100. The initiation acknowledgement message 1200 may comprise a Session Id 1202, a Sec Mode 1204, a Status 1206, and a Message Id 1208. The Session Id 1202 and the Message Id 1208 may be substantially the same as the corresponding fields of the initiation message 1100. The Sec Mode 1204 may include the same value as the Sec Mode 1104 when the Status 1206 indicates success. Otherwise, the Sec Mode 1204 may include a value set by the PDP. The Status 1206 may indicate the success or failure of the processing of the initiation message 1100. For instance, the Status 1206 may have values below about 128 to indicate "success" or values above about 128 to indicate "failure." In an embodiment, the Status 1206 may have a value of about zero to indicate "success," a value of about 128 to indicate "reason unspecified," a value of about 129 to indicate "security mode not supported," a value of about 130 to indicate "invalid format," or a value of about 131 to indicate "certificate not accepted." The See Mode 1204 may include the same value as the Sec Mode 1104 when the Status 1206 indicates success. Otherwise, the Sec Mode 1204 may include a value set by the PDP. In an embodiment, the Session Id 1202, the Sec Mode 1204, the Status 1206, and the Message Id 1208 may have a length equal to about 16 bits, about eight bits, about eight bits, and about 32 bits, respectively.

Figure 13:
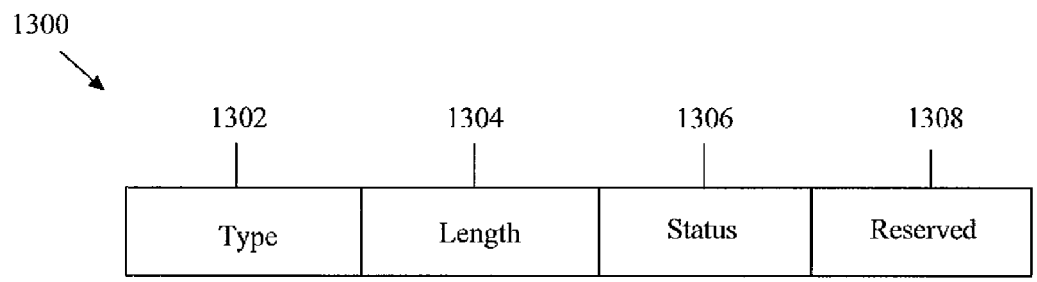
FIG. 13 is a schematic diagram of an embodiment of an acknowledgement option.

FIG. 13 illustrates an embodiment of an acknowledgement option 1300, which may be used to carry information about a requested operation. For instance, the acknowledgement option 1300 may be included in the request message 900. In an embodiment, the acknowledgement option 1300 may comprise a Type 1302, a Length 1304, a Status 1306, and a Reserved field 1308. The Type 1302 may be a specific value assigned to indicate the acknowledgement option. The Length 1304 may comprise the length of the acknowledgement option 1300 in octets. The Status 1306 may indicate the success or failure of an operation, and may be configured substantially similar to the Status 1206. The Reserved field 1308 may be reserved for other purposes. In an embodiment, the Type 1302, the Length 1304, the Status 1306, and the Reserved field 1308 may each have a length equal to about eight bits.

Figure 14:
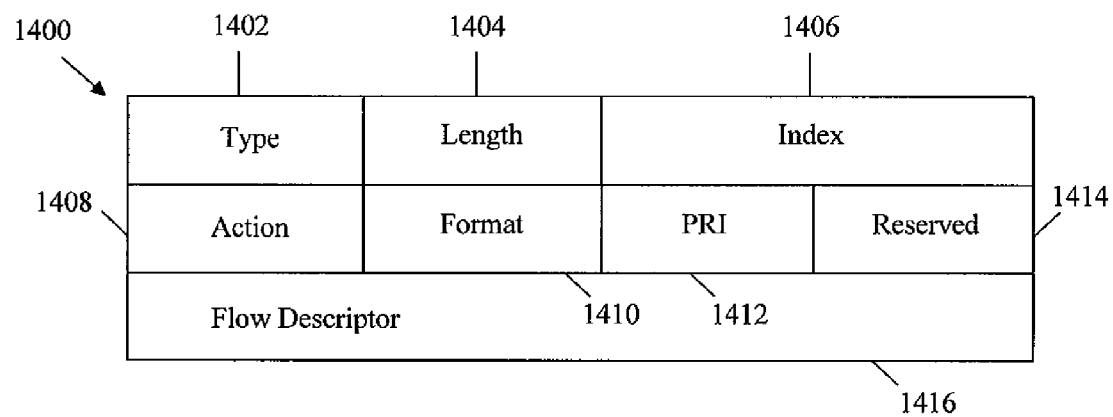
FIG. 14 is a schematic diagram of an embodiment of a flow identifier option.

FIG. 14 illustrates an embodiment of a filter or flow identifier option 1400, which may be included in the request message 900. The flow identifier option 1400 may be used to encode information that describes one flow and the treatment needed for such flow. A host or an end node may request that a flow be allowed, blocked, or removed from the firewall, which may default to the firewalls original settings. In an embodiment, the flow identifier option 1400 may comprise a Type 1402, a Length 1404, an Index 1406, an Action 1408, a Format 1410, a PRI 1412, a Reserved field 1414, and a Flow Descriptor 1416. The Type 1402, the Length 1404, and the Reserved field 1414 may be configured substantially similar to the corresponding fields described above. The Index 1406 may have a unique value that identifies a particular flow description. The value may be assigned to the flow description by the end node. The Action 1408 may indicate the type of operation requested by the end node for the flow included in the option. For instance, the Action 1408 may have a value of about one to indicate a request to allow the flow, a value of about two to indicate a request to block a flow, a value of about three to indicate a request to update a flow, and a value of about four to indicate a request to delete a flow. The Format 1410 may indicate the format used for the flow descriptor. The PRI 1412 may indicate the priority of a particular flow. For instance, a lower value may indicate a higher priority. In an embodiment, the PRI 1412 may have a value of about one to indicate the highest priority, but may not have a value of about zero. The PRI 1412 field may be used in cases where two flow descriptions may have conflicting values for the Action 1408. Hence, the Action 1408 associated with the PRI 1412 with higher priority may take precedence. In an embodiment, the Type 1402, the Length 1404, the Index 1406, the Action 1408, the Format 1410, the PRI 1412, and the Reserved field 1414 may have a length equal to about eight bits, about eight bits, about 16 bits, about eight bits, about eight bits, about eight bits, and about eight bits, respectively.

Figure 15:
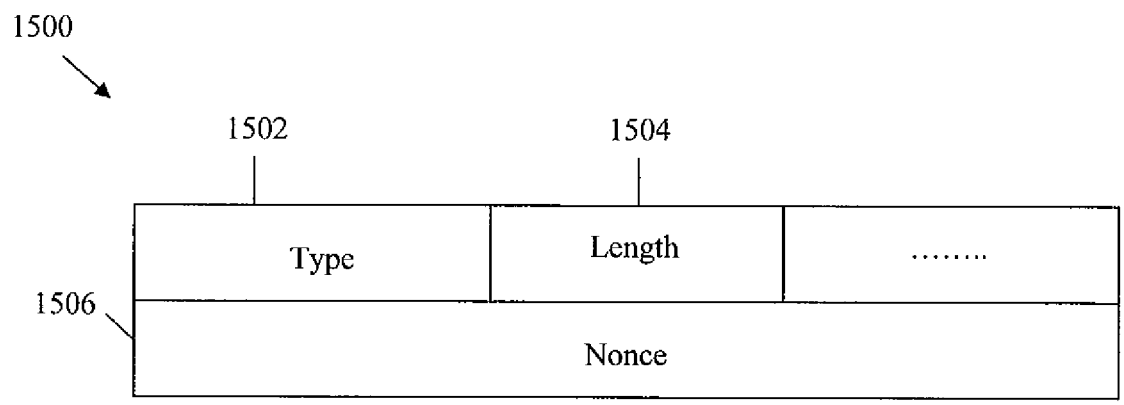
FIG. 15 is a schematic diagram of an embodiment of a nonce option.

FIG. 15 illustrates an embodiment of a nonce option 1500, which may be included in the request message 900. The nonce option 1500 may be used to ensure updated acknowledgements from the PDP to the end node. As such, the PDP may receive and nonce option 1500 in the request message 900 and resend the nonce option 1500 in the response message 1000. As such, the nonce option 1500 may be selected for each transmitted request message 900. The PDP may receive the request message 900 and copy the nonce option 1500 into the response message 1000, regardless of the status of any individual flow. The nonce option 1500 may have a variable format, which may be generated randomly, for instance using a random generator or hardware. In some embodiments, the nonce option 1500 may comprise a Type 1502 and a Length 1504, which may be substantially the same as the corresponding fields described above, as well as a nonce 1506. In some embodiments, the nonce option 1500 may also comprise other fields. The nonce 1506 may be a block of data selected by the sender, such as the end node. In an embodiment, the length of the nonce 1506 may not exceed about 384 bits. In an embodiment, the nonce 1506 may comprise at least about 64 bits of unpredictable random data. The PDP may cache the nonce 1506 after verifying that duplicate request packets are not processed from the same source. In an embodiment, the Type 1502 and the Length 1504 may each have a length equal to about eight bits.

Figure 16:
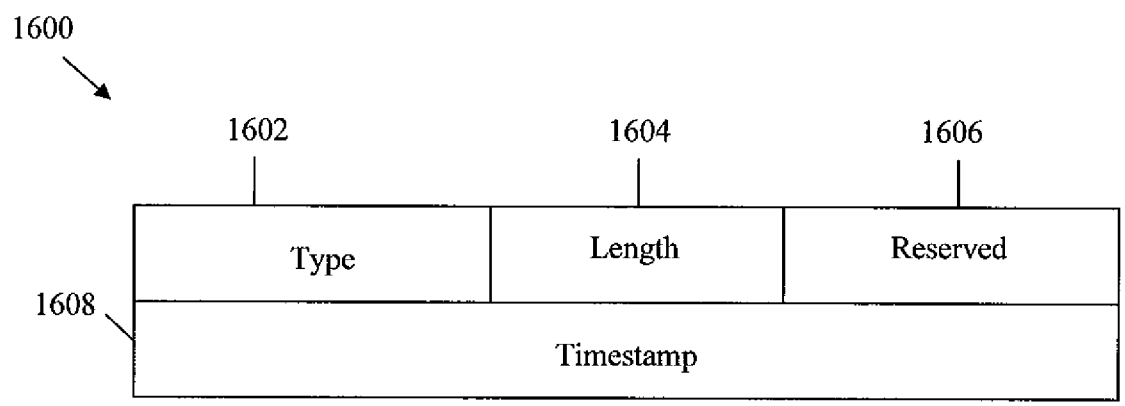
FIG. 16 is a schematic diagram of an embodiment of a timestamp option.

FIG. 16 illustrates an embodiment of a timestamp option 1600, which may be included in the request message 900. The timestamp option 1600 may be used to ensure that unauthorized nodes are unable to create a connection state by replaying signed FCON messages. The timestamp option 1600 is based on alignment or synchronization between clock information in the PDP and the end node, and therefore may have limitations when secured or accurate time synchronization is not available. The timestamp option 1600 may comprise a Type 1602, a Length 1604, and a Reserved field 1606, which may be substantially the same as the corresponding fields described above, as well as a Timestamp 1608. In some embodiments, the timestamp option 1600 may also comprise other fields. The timestamp 1608 may comprise a timestamp, which may be about a 64-bit integer. The timestamp 1608 may have a value equal to about the number of seconds since Jan. 1, 1970, 00:00 UTC, for instance using a fixed point format. As such, an integer number of seconds may be included in the first 48 bits of the field, and the remaining 16 bits may indicate a number of fractions of a second, where each fraction is equal to about $\frac{1}{64000}$ of a second. Each FCON message may comprise the Timestamp option 1600. Hence, the recipient, e.g. the PDP or the end node, may verify that the timestamp is valid and indicates an updated message. In an embodiment, the timestamp option 1600 may be processed at some delay after receiving the message to compensate for packet transfer delays, for example on multi-hop networks, or for delays during connection state creation. In an embodiment, the Type 1602 and the Length 1604 may each have a length equal to about eight bits.

Figure 17:
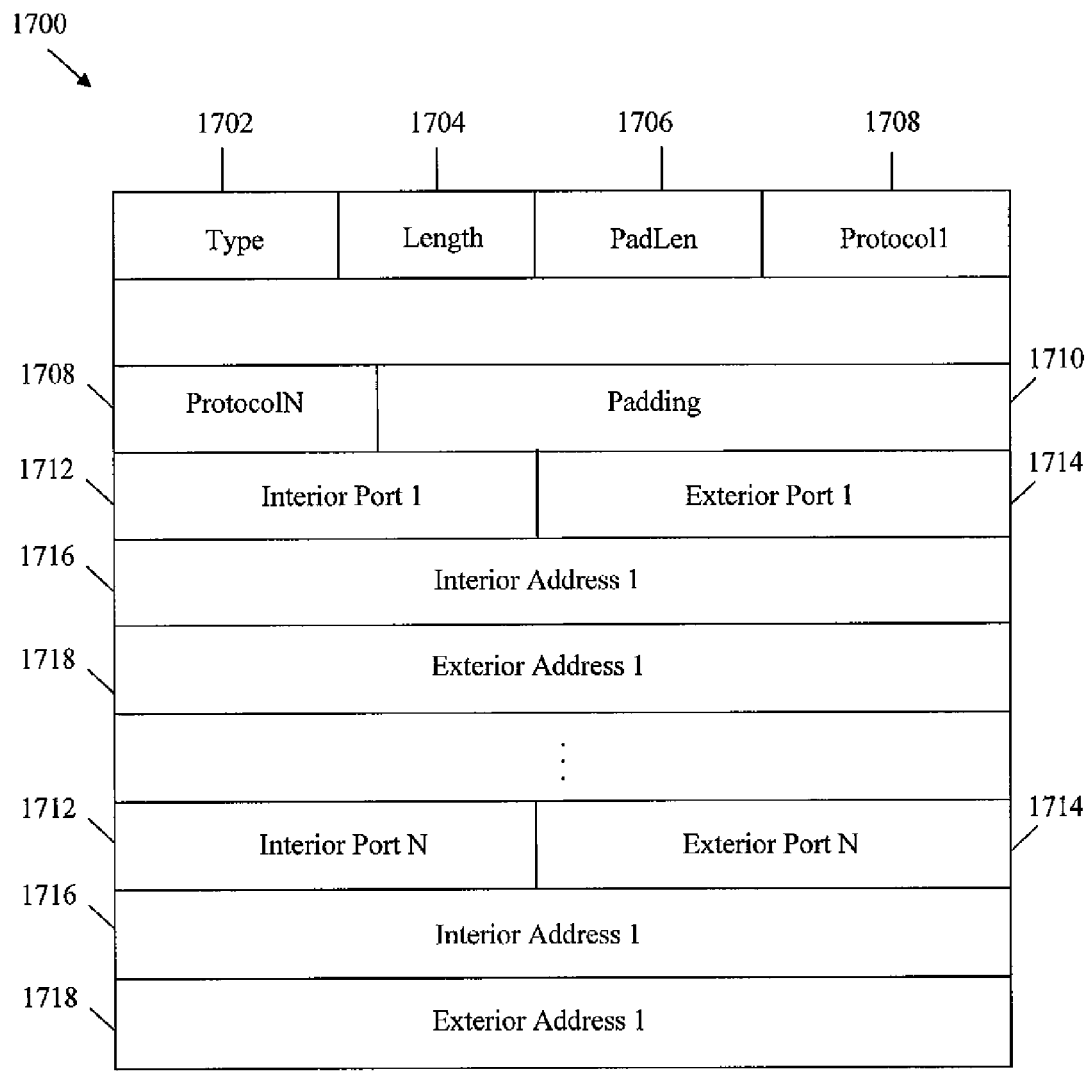
FIG. 17 is a schematic diagram of an embodiment of an address option.

FIG. 17 illustrates an embodiment of an IP address option 1700, which may be included in the request message 900. The IP address option 1700 may be used to request a unique IP address, such as IPv4 or IPv6, and at least one port number. In an embodiment, the IP address option 1700 may comprise a Type 1702 and a Length 1704, which may be substantially similar to the corresponding fields described above. The IP address option 1700 may also comprise a PadLen 1706, a plurality of Protocols 1708 (Protocol1, . . . , ProtocolN), and a Padding 1710. The PadLen 1706 may comprise the length in bytes of the Padding 1710. The Protocols 1708 may comprise the IP protocol numbers associated with specific protocols. The Padding 1710 may be set to about zero by the sender and ignored by the receiver. In an embodiment, the Type 1702, the Length 1704, the PadLen 1706, and any Protocol 1708 may each have a length equal to about eight bits.

Additionally, the IP address option 1700 may comprise a plurality of Interior Ports 1712 (Interior Port 1, . . . , Interior Port N), a plurality of Exterior Ports 1714 (Exterior Port 1, . . . , Exterior Port N), a plurality of Interior Addresses 1716 (interior Address 1, . . . , Interior Address N), and a plurality of Exterior Addresses 1718 (Exterior Address 1, . . . , Exterior Address N). The Interior Ports 1712 and the Exterior Ports 1714 may each comprise a transport layer internal identifier of one session for which a mapping is requested. In an embodiment, the transport layer internal identifier may have a length equal to about 16 bits. In an embodiment, the Interior Ports 1712 may be set to zero when the request is related to a protocol that does not use a transport layer internal identifier. The Interior Addresses 1716 may each comprise an address of an internal IP address for which a mapping is requested. The Exterior Addresses 1718 may each comprise an external IP address to which a mapping is requested. The Exterior Addresses 1718 may be set to zero in the request message 900 when the PDP is in charge of assigning addresses. In an embodiment, any Interior Port 1712, any Exterior Port 1714, any Interior Address 1716, and any Exterior Address 1718 may each have a length equal to about 16 bits.

Figure 18:
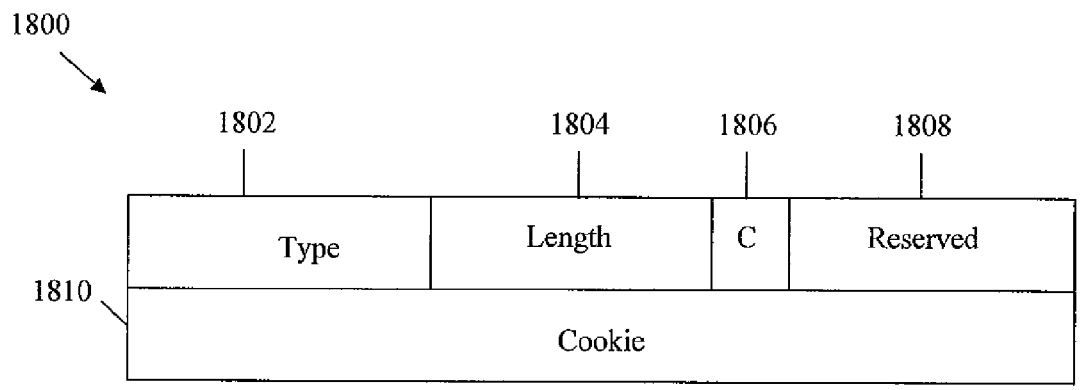
FIG. 18 is a schematic diagram of an embodiment of a cookie option.

FIG. 18 illustrates an embodiment of a cookie option 1800, which may be included in the initiation message 1100. The IP address option 1700 may comprise a string of information required by the PDP, including security credentials from the host or the end node. When the host or end node sends such information, it may add the cookie option 1800 to the initiation message 1100 or to a Certification Path Advertisement message to validate its credentials. In an embodiment, the cookie option 1800 may comprise a Type 1802, a Length 1804, a C field 1806, and a Reserved field 1808, which may be substantially similar to the corresponding fields described above. The cookie option 1800 may also comprise a C filed 1806 and a Cookie 1810. The C field 1806 may be a flag, which may be set to indicate Certificate Path Discovery is on. When the flag is set, the PDP may send a response using Certification Path Advertisement messages to pass the list of certificates to the host or end node. If this flag is not set, the host may use the initiation message 1100 instead of the Certification Path Advertisement message. The Cookie 1810 may be a string of bytes chosen by the PDP to ensure up to date or updated responses. In an embodiment, the Type 1802, the Length 1804, the C field 1806, and the Reserved field 1808 may have a length equal to about eight bits, about eight bits, about one bit, and about 15 bits, respectively.

Figure 19:
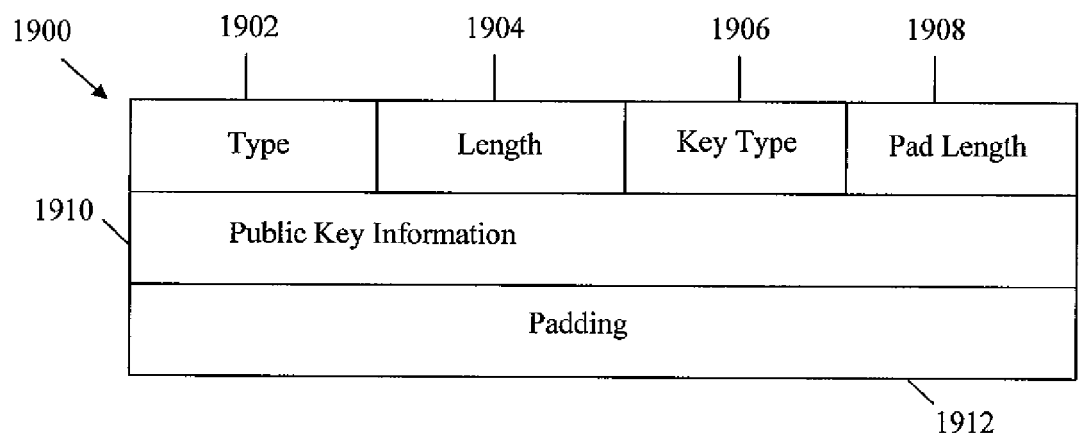
FIG. 19 is a schematic diagram of an embodiment of a public key option.

FIG. 19 illustrates an embodiment of a public key option 1900, which may be sent in a message from the end node to the PDP. The public key option 1900 may be used to provide information to the PDP about the identity being used to sign the message. By using the key information in this option, or a cached copy, the PDP may use information in the Digital Signature Option, to verify the message's integrity. This Option may be present in the message sent from a particular host to a PDP, and from a PDP to a host with which it has not communicated, unless the same information is provided within the message using a Certificate Option. If a host or PDP communicates with each other during a period where security state is still in existence, then the sender may not use the public key option 1900.

The public key option 1900 may comprise a Type 1902, a Length 1904, a Key Type 1906, a Pad Length 1908, a Public Key Information 1910, and a Padding 1912, which may be substantially similar to the corresponding fields described above. The public key option 1900 may also comprise a Key Type 1906, which may comprise a description of the keying information to be supplied in the following Public Key Information 1910. For instance, the Key Type 1906 may have a value of about one to indicate that the Public Key Information 1910 is associated with a CGA. The public key option 1900 may also comprise a Public Key Information 1910, which may comprise a stream of bytes describing a public key according to the algorithm-specific format specified in the Key Type 1906. In an embodiment, the Type 1902, the Length 1904, the Key Type 1906, and the Pad Length 1908, may each have a length equal to about eight bits.

Figure 20:
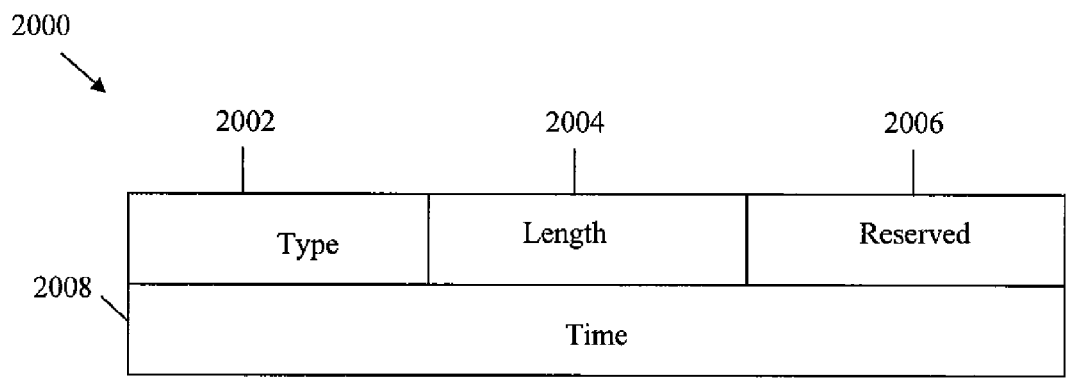
FIG. 20 is a schematic diagram of an embodiment of a lifetime option.

FIG. 20 illustrates an embodiment of a lifetime option 2000, which may be included in the response message 1000 and the initiation acknowledgement message 1200. For instance, the lifetime option 2000 may sent from the PUP to the end node to indicate the lifetime for the entries in the request message 1000 or to indicate the lifetime of a security association, respectively. The lifetime option 2000 may comprise a Type 2002, a Length 2004, and a Reserved field 2006, which may be substantially similar to the corresponding fields described above. The lifetime option 2000 may further comprise a Time 2008, which may comprise the lifetime in units of seconds. In an embodiment, the Type 2002, the Length 2004, the Reserved field 2006, and the Time 2008 may have a length equal to about eight bits, about eight bits, about 16 bits, and about 32 bits, respectively.

Figure 21:
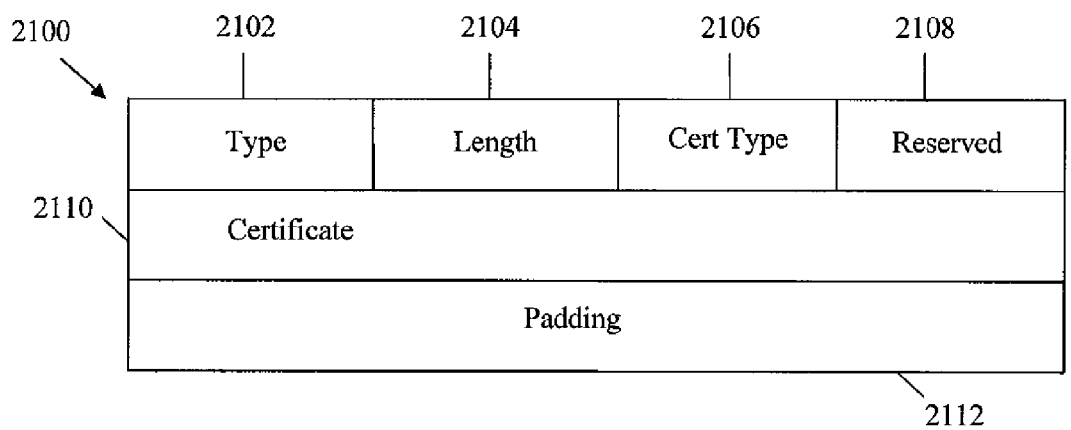
FIG. 21 is a schematic diagram of an embodiment of a certificate option.

FIG. 21 illustrates an embodiment of a certificate option 2100, which may be included in the Certification Path Advertisement message between the host and the PDP. The certificate option 2100 may comprise a digital certificate issued by one of the Certificate Authorities in the sender's trust chain. The certificate option 2100 may be used to provide trust to the sender or its authorizing authorities. In an embodiment, the certificate option 2100 may be included in the request message 900 instead of the public key option 1900. Preferably, one of the certificate option 2100 and the public key option 1900 may be included in the request message 900 when using the FCON. The certificate option 2100 may comprise a Type 2102, a Length 2104, a Reserved field 2108, and a Padding 2112, which may be substantially similar to the corresponding field described above. The certificate option 2100 may also comprise a Cert Type 2106, which may comprise the type of certificate presented in the Certificate 2110. In an embodiment, the Cert Type 2106 may have a value of about one to indicate an X.509v3 digital certificate. The certificate option 2100 may also comprise a Certificate 2110, which may comprise a stream of bytes describing one of the sender's certificates from its trust chain. The format of a particular certificate may be determined by the Cert Type 2106. In an embodiment, the Type 2102, the Length 2104, the Reserved field 2108, and the Cert Type 2106 may each have a length equal to about eight bits.

Figure 22:
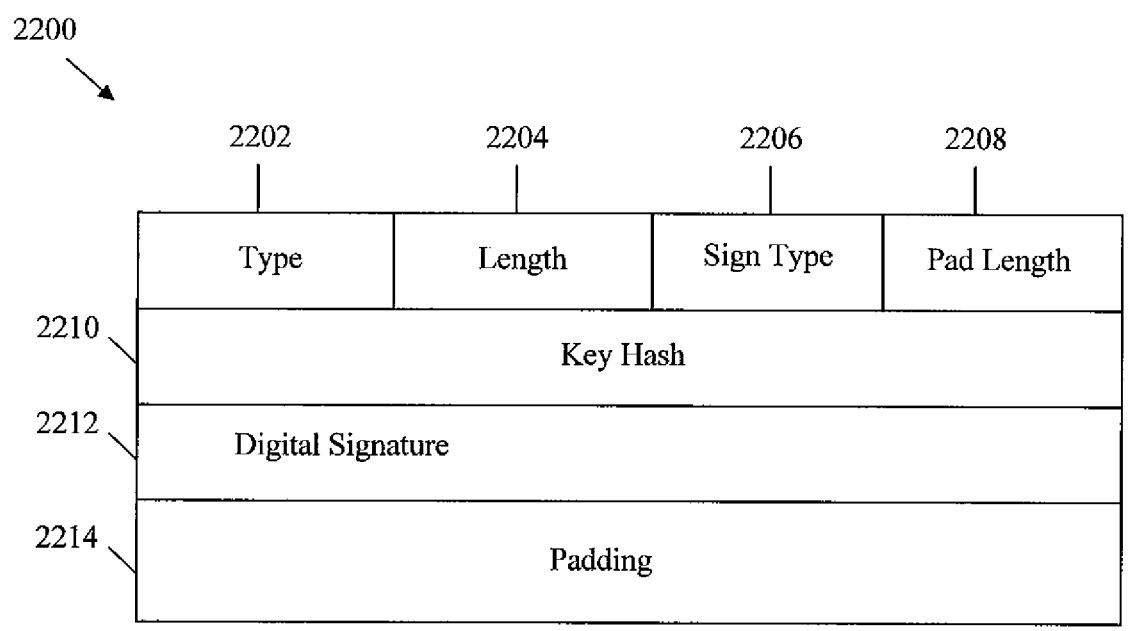
FIG. 22 is a schematic diagram of an embodiment of a digital signature option.

FIG. 22 illustrates an embodiment of a digital signature option 2200, which may be included in the FCON messages to authenticate the preceding message contents. Accordingly, the digital signature option 2200 may be used to perform a signature over the message contents using a Key Hash field. The digital signature option 2200 may be placed last in a sequence of options before transmission. In an embodiment, if multiple identities are signing the message, the most specific or private user may sign the message with the first digital signature option before the remaining identities, who may be hosts. Subsequent signers may include all required option information to ensure validation of their message after the first signature, and then include their own digital signatures. This allows user level and host level authentication within the same message, and provides distinction between administrative and non-power users, for instance on a multi-user server. In an embodiment, if a node, such as a peer device, receives a digital signature and is unable to identify the public key to which the signature is associated, the node may challenge the sender, or silently discard the received message. Hence, including the public key option 1900 in a message may be necessary unless the node has recently received it.

The digital signature option 2200 may comprise a Type 2202, a Length 2204, a Pad Length 2208, and a Padding 2214, which may be substantially similar to the corresponding fields described above. The digital signature option 2200 may also comprise a Sign Type 2206, which may comprise the type of the Digital Signature 2212. For instance, the Sign Type 2206 may have a value of one to indicate a PKCS 1.5 Digital Signature. The digital signature option 2200 may also comprise a Key Hash 2210, which may comprise the first 128 bits or about 128 bits to the left (most significant) of an SHA-1 hash over the public key information included in the Public Key Information 1910. The digital signature option 2200 may also comprise a Digital Signature 2212, which may comprise a digital signature of the format specified in the field Sign Type 2206. The Digital Signature 2212 may be associated with the entire message, for instance including an ICMPv6 Pseudo Header, and all options preceding the digital signature option 2200. In an embodiment, the Type 2202, the Length 2204, the Pad Length 2208, and the Sign Type 2206 may each have a length equal to about eight bits.

Figure 23:
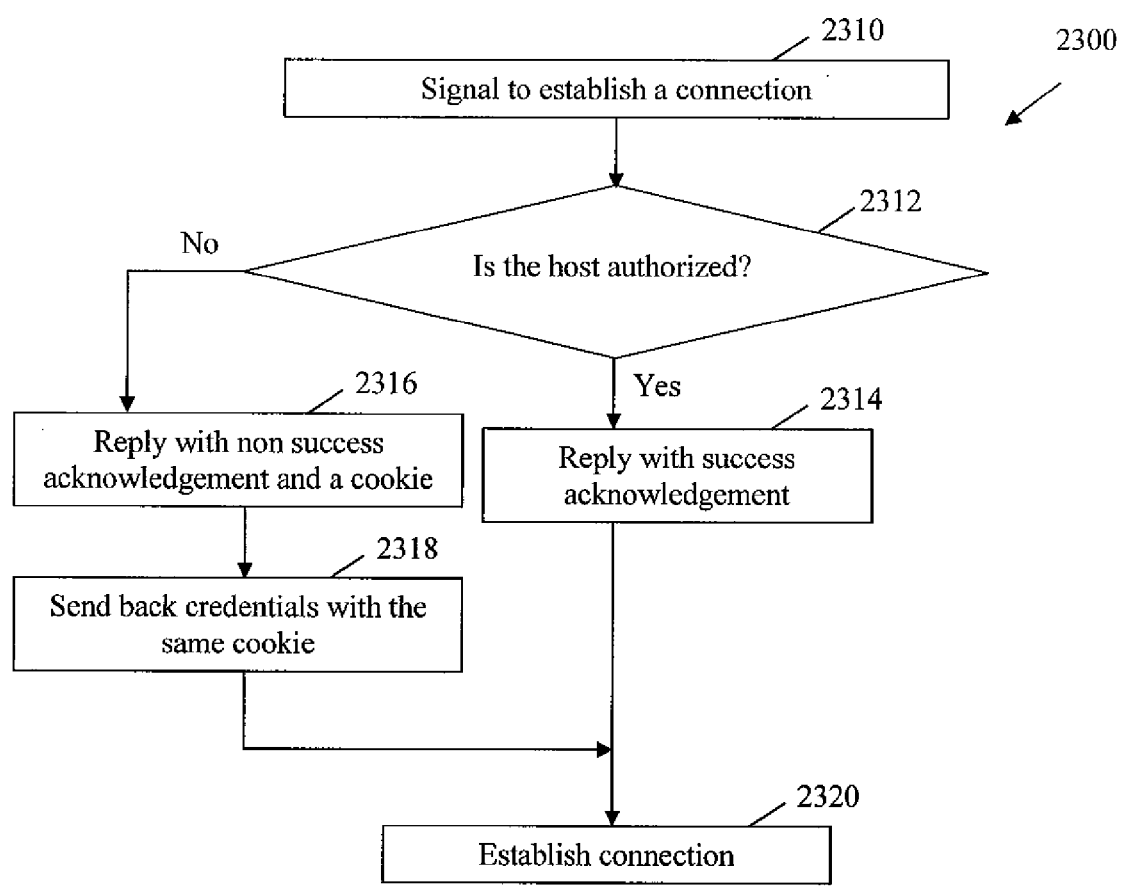
FIG. 23 is a flowchart of an embodiment of a connection establishment method.

FIG. 23 illustrates an embodiment of a connection establishment method 2300, which may be implemented using the FCON. At block 2310, a signal may be sent from a host to a PDP to create a connection on a PEP or a firewall. For instance, the host may signal the PEP using an initiation message, which may comprise credential information, or a request message, which may comprise filter information describing the host's requested protocol behavior. The initiation message or the request message may comprise a public key option or a certificate option including the relevant public key, a digital signature option, a timestamp option, and a nonce option. Additionally, the initiation message may comprise a unique session identifier, which may be set by the host and may be used for subsequent signaling of other messages upon successfully establishing a secure session.

Starting at block 2312, the connection establishment method 2300 may determine whether the host is authorized to receive responses or to establish a connection. For instance, the PDP may use the contents of the message to authorize or authenticate the host. The connection establishment method 2300 may proceed to block 2314 if the condition at block 2312 is met. Otherwise, the connection establishment method 2300 may proceed to block 2316. At block 2314, the connection establishment method 2300 may respond to the request with an appropriate success acknowledgement. For instance, the PDP may send to the host an initiation acknowledgement message. The connection establishment method 2300 may then proceed to block 2320, where a connection may be established between the host and the PDP.

Alternatively, at block 2316, when the host is not authorized, the connection establishment method 2300 may respond with a non success acknowledgement. For instance when the PDP is not able to authenticate the credentials for the host, the PDP may reply with an initiation acknowledgement message comprising a non success response code, and a cookie option. The connection establishment method 2300 may then proceed to block the 2318. At block 2318, the connection establishment method 2300 may forward the credentials of the host to the PDP with the same cookie. For instance, the host may send additional information in the form of a sequence of Certificate Path Advertisements if allowed based on the cookie option. When all credentials are transmitted, the host may send an initiation message comprising the last received cookie. The connection establishment method 2300 may then proceed to block 2320, where a connection may be established between the host and the PDP. In an embodiment, the host may stop transmitting additional credentials when the initiation acknowledgement from the PDP comprises a code that indicates "Liveness Test Needed" instead of a non success response code.

Figure 24:
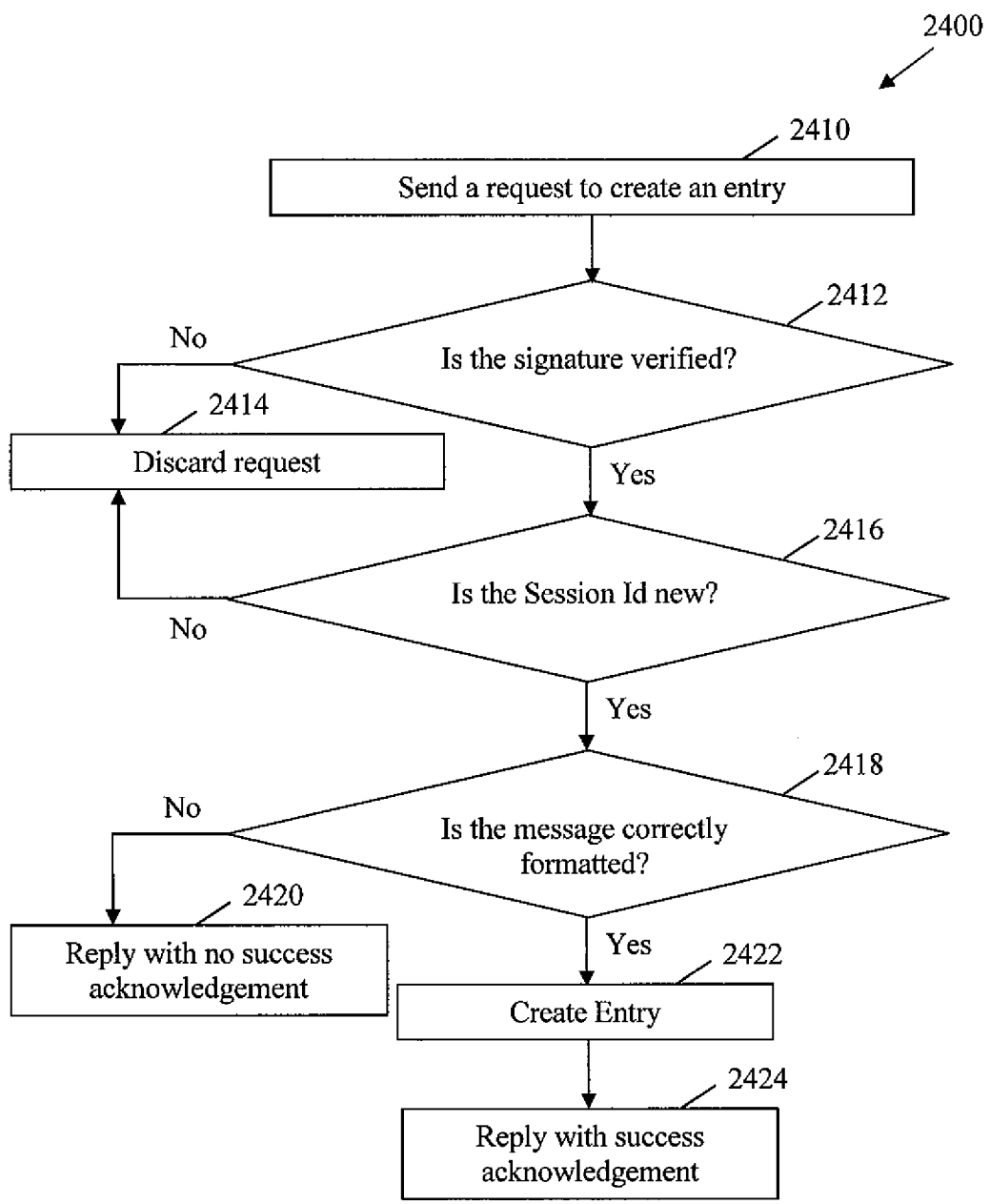
FIG. 24 is a flowchart of an embodiment of an entry creation method.

FIG. 24 illustrates an embodiment of an entry creation method 2400, which may be implemented using the FCON to create entries associated with flows or sessions at the firewall or PEP. For instance, the entries may comprise one or more flow or session identifications, such as a Session Id. Initially at block 2410, the entry creation method 2400 may send a request to create an entry. For instance, the end node may send a request message to the PDP, which may comprise an appropriate Session Id value and a Message Id. The request message may also include a nonce option and a digital signature option. Each option may comprise a unique Index field, an appropriate Action field, and a Format field indicating the format of the Flow Descriptor, and an appropriate priority in the PRI field. In an embodiment, the request message may not comprise all existing or previously created entries, but only the entries for new flows or sessions.

At block 2412, the entry creation method 2400 may verify that the signature is in the request. For instance, the PDP may receive the request message and may verify that the signature is in the request message to identify the user or sender. The entry creation method 2400 may proceed to block 2416 if the signature is verified. Otherwise, the entry creation method 2400 may proceed to block 2414, where the request may be discarded with no further action. At block 2416, the entry creation method 2400 may verify whether the flow or session is new. For instance, the PDP may verify whether the Session Id included in the message or message header is new or already known. If the Session Id is not new, the entry creation method 2400 may proceed to block 2414, where the request may be discarded. Otherwise, the entry creation method 2400 may proceed to block 2418. In an embodiment, the entry creation method 2400 may respond to the end node with success acknowledgement when the Session Id is found new. For instance, the PDP may send a response message to the end node with the same Session Id and Message Id, including an acknowledgement option with the Status field set to 130, for instance.

At block 2418, the entry creation method 2400 may verify whether the message is valid or correctly formatted. The PDP may inspect each flow identifier option. The entry creation method 2400 may proceed to block 2422 if the message is found valid. Otherwise, the entry creation method 2400 may proceed to block 2420, where a reply with no success acknowledgement may be sent back. For instance, if an error is found in any of the options, the PDP may send a response message with the acknowledgement option indicating failure with the appropriate error code. The failed option may be included in the response message.

At block 2422, the entry creation method 2400 may create the entry. For instance, the PDP may process the successful options and create the entries. The entry creation method 2400 may then proceed to block 2424, where a response may be sent to indicate that the new entry is created. For instance, if all options are processed successfully, the PDP may send a response message to the end node, which may comprise the same Session Id and the Message Id as the request message. The response message may also include the acknowledgement option with a Status that indicates success and a lifetime option with a lifetime associated with the new entries. The lifetime may be used by the end node to determine when to update the entries again, e.g., before the lifetime expires. Additionally, the response message may comprise a nonce option and a digital signature option.

Figure 25:
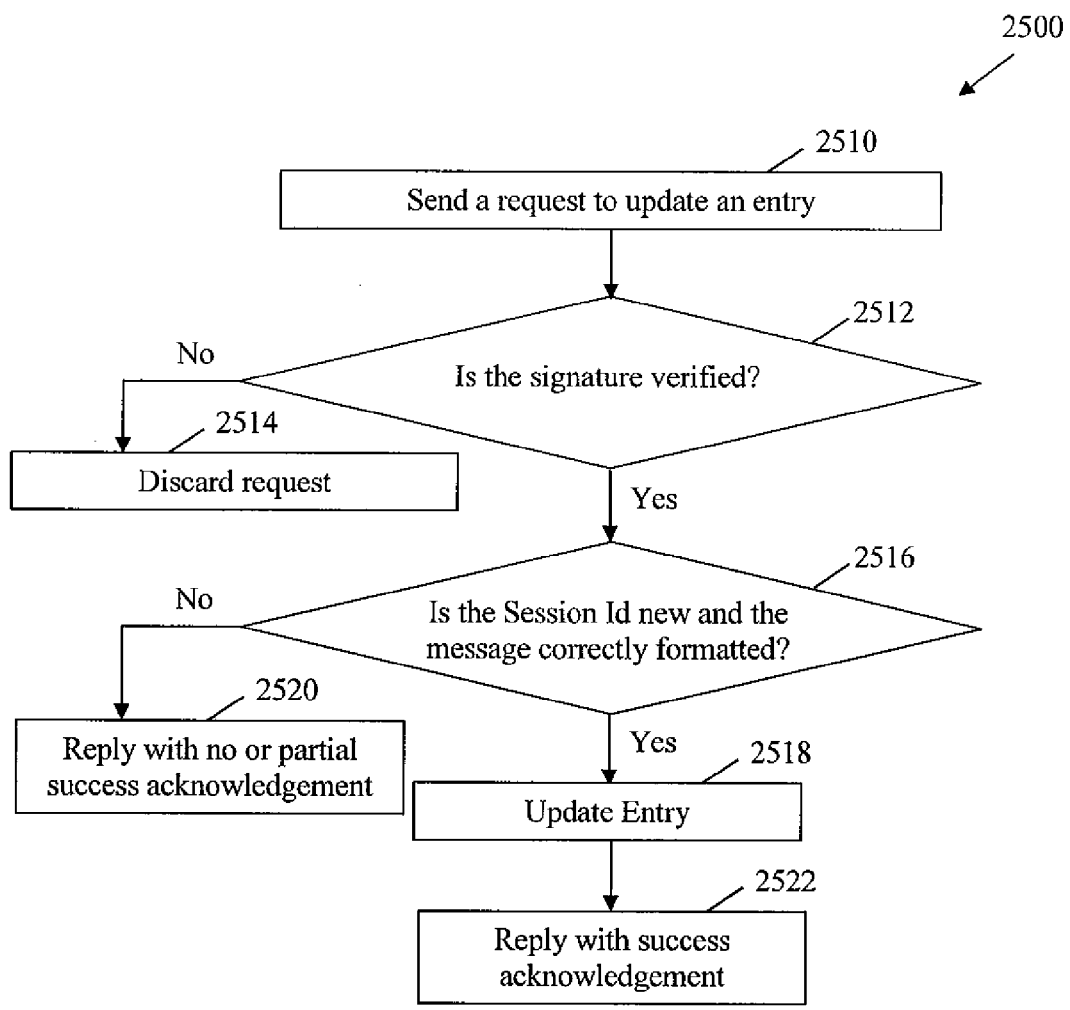
FIG. 25 is a flowchart of an embodiment of an entry update method.

FIG. 25 illustrates an embodiment of an entry update method 2500, which may be implemented using the FCON to update entries at the firewall or PEP. The entries may be updated to change the flow description, to delete an existing entry, or to refresh an entry before its timer expires. In an embodiment, the entries may be refreshed without sending the entire flow identifier option in a request message. Instead, the flow identifier option may be sent separately without the Flow Descriptor. The update method 2500 may start at block 2510, where a request may be sent to update at least one entry, similar to sending a request to create an entry in the entry creation method 2400. At block 2512, the entry update method 2500 may verify the signature in the request, as described above. The entry update method 2500 may proceed to block 2516 if the signature is verified. Otherwise, the entry update method 2500 may proceed to block 2514, where the request may be discarded.

At block 2516, the entry update method 2500 may verify whether the flow or session is known and whether the message is valid or correctly formatted. In other embodiments, the entry update method 2500 may separately verify whether the flow or session is known and whether the message is valid or correctly formatted, for instance at two separate blocks, as described above. The entry update method 2500 may proceed to block 2518 to update the entry if both conditions are met, and then proceed to block 2522, or may otherwise proceed to block 2520. At block 2522, a response may be sent to indicate that the new entry is updated. After receiving the Response message, the requesting node updates its list of accepted entries and the corresponding lifetimes for those entries. Alternatively, at block 2520 the entry update method 2500 may reply no success acknowledgement being sent back.

For instance, if an error is found in all the flow identifier options sent for update, the PDP may send a response message with the acknowledgement option indicating failure with the appropriate error code. If some of the filter or flow identifier options are rejected and the remaining are accepted, the acknowledgement option in the response message may indicate partial success. The response message may also comprise the lifetime option with an appropriate lifetime for the accepted options. Additionally, the response message may comprise at least some of the failed or rejected options, which may each have a corresponding Status field that indicates the reason for failure.

Figure 26:
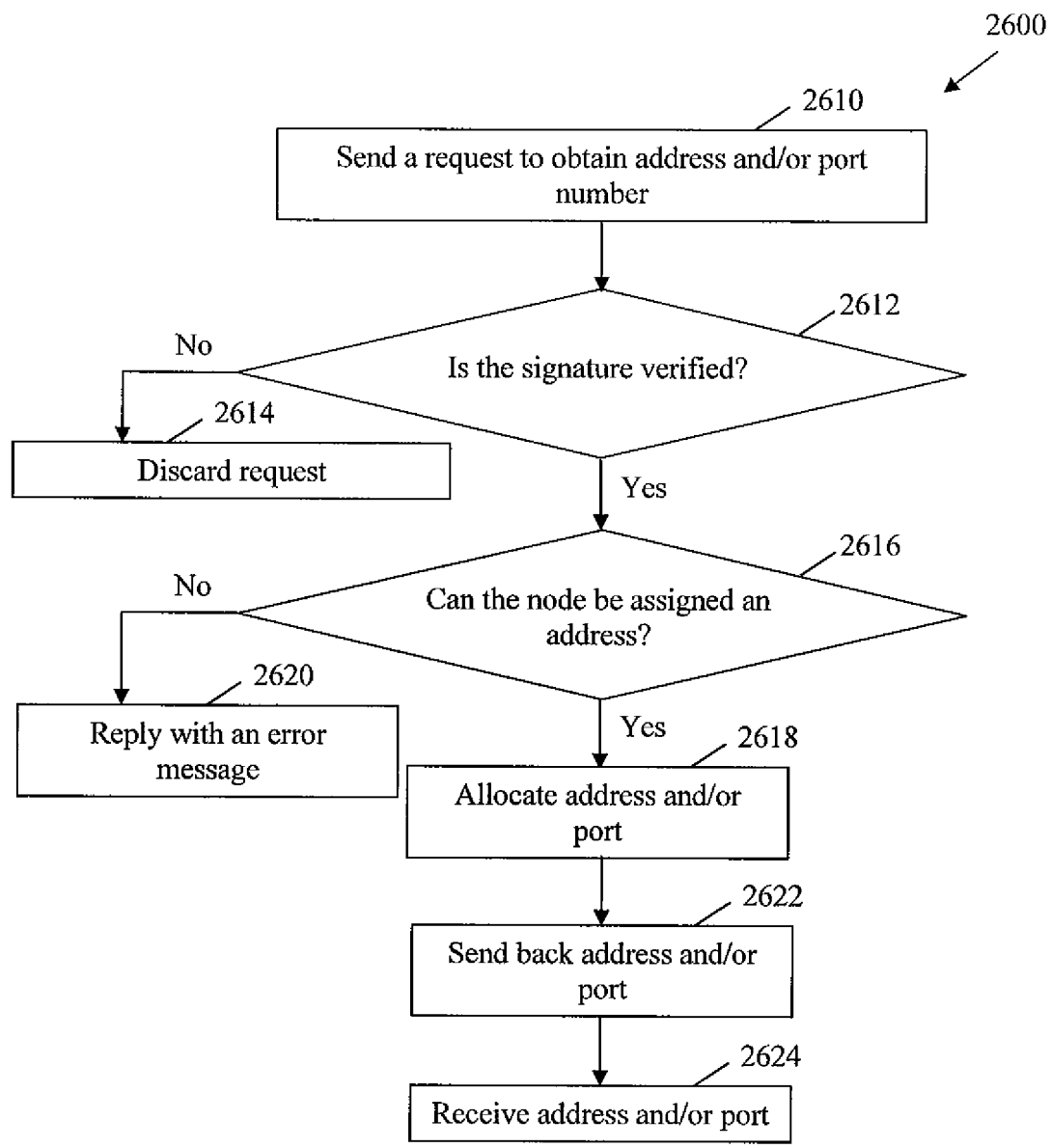
FIG. 26 is a flowchart of an embodiment of an address request method.

FIG. 26 illustrates an embodiment of an address request method 2600, which may be implemented using the FCON to obtain allocated addresses, port numbers, or both. For instance, the address request method 2600 may be used to obtain the public IPv4 address, port numbers, or both allocated by a NAT to a node, such as an end node for at least one application. Initially at block 2610, the address request method 2600 may request at least one address, such as an IP address, at least one port number, or both. Additionally, the address request method 2600 may specify, in its request, the protocol to be used. For instance, a request message may be sent including the address option, which may be an IP address option, the nonce option, and the digital signature option. At block 2612, the address request method 2600 may verify the signature in the request. The address request method 2600 may then proceed to block 2616 if the signature is verified.

Otherwise, the address request method 2600 may proceed to block 2614, where the request may be discarded.

At block 2616, the address request method 2600 may verify whether the node can be assigned an address, for instance, when the PDP allows nodes to request an IPv4 address. When the condition at block 2616 is not met the address request method 2600 may proceed to block 2620, where a reply with an error message may be sent. For instance, the PDP may reject the request by sending a response message with an acknowledgement option comprising the appropriate error code. Otherwise, the address request method may proceed to block 2618, where the address request method 2600 may allocate the address, port number, or both. For instance, the PDP may communicate with the NAT to allocate the address, port number, or both. The address request method 2600 may then proceed to block 2622 to send back the allocated address, port number, or both. For instance, the PDP may send a response message to the node comprising the address option, which includes any allocated addresses and port numbers, the nonce option, the lifetime option, and the digital signature option.

The address request method may then proceed to block 2624, where the address, the port number, or both may be received. For instance, the node may receive the response message and the digital signature option. Hence, the node may use all received addresses, which may be IP addresses, and ports allocated in the message for the duration of the lifetime in the lifetime option. In an embodiment, to update or refresh the allocated IP addresses and ports, the node may send again a request message with the address option including all the previously allocated IP addresses and ports.

According to the firewall protocol, when the host or end node sends a message or packet and receives no response from the PDP, for instance during any of the methods above, the host or end node may retransmit the message or packet. In an embodiment, the message or packet may be retransmitted up to about four times, each time with a different nonce and an updated timestamp. In an embodiment, delays or timeouts between the transmissions may be increased exponentially, for instance, when the first delay or timeout is about one second, the second and third delays or timeouts may be about two and four seconds, respectively. In an embodiment, the host may delay the first retransmission between about zero to about 100 milliseconds to maintain the sequence of retransmissions. In an embodiment, the PDP may not send messages or packets to the host, except in response to a FCON message. The PDP may reply to any message or packet by sending a message or packet to the source IP address without pause or delay to guarantee quick responses.

Further, when a new session is established, such as a Transmission Control Protocol (TCP) or User Datagram Protocol (UDP) session, its data plane transmissions may introduce substantial delays before implementing the FCON. Hence, it may be advantageous to implement the FCON before data transmissions, for instance when losing initial packets may be tolerated, such as in the case of Voice over Internet Protocol (VoIP).

Additionally, when the host establishes at least one existing communication before starting a connection with the PDP, the host may begin sending packets without substantial delay after sending a FCON request. Hence, a new state may also be created without substantial delay and latency may be reduced, which may result in losing and retransmitting initial packets. In some embodiments, if the host has not established a connection with a PDP, the host may send the data plane packets after some pausing or waiting, in order to limit additional delays due to retransmission and timeout at the transport layer of the data session.

In terms of network security, the FCON may use CGAs to provide proof of address ownership. However, the CGAs may not be sufficient to authorize communications for a particular destination using the FCON. For instance for devices where a plurality of users may have permission to access specific data services and other users may not have such permission, using the CGAs may not be sufficient to distinguish or identify which of the users attempting a communication are authorized. To provide such distinction, user level digital signatures may be used in addition to the CGAs. Alternatively, a plurality of users on a host may be assigned CGAs associated with corresponding public key information and a single digital signature, which may then be processed by the PDP.

To prevent denial of service in the FCON, such the request messages may require authentication of the node and the response messages may require proof of the PDP's identity regardless of the identity of the message signer. In an embodiment, when a host receives a plurality of denial of service replies from the PDP, the host may defer processing digital signatures upon receiving PDP responses, and may use instead updates and nonce information in the messages to determine if a digital signature needs to be processed. Hence, denial of service replies may be reduced.

In some embodiments, it may not be feasible to store at a PDP along a particular path all relevant information for firewall policy. Hence, sending data to the PDP may not guarantee creating a connection state in all firewalls on the path, which may lead to dropping some packets, even when signaling is established successfully. To prevent or reduce dropped packets, a plurality of create message or packets may be sent to the PDP to inform the PDP of all changes occurring along the path at the time establishing a data connection. Such packets may be sent between the same node with the same IP source and destination as the data packets. However, such packets may comprise a router-alert hop-by-hop option, which may be identified by the PDP to indicate create packets including the relevant information for firewall policy. Hence, the filter contents, preferences, or options in the message, may be used to define which sessions are requested to be allowed through the firewall.

Depending upon policy, the PDP or PEP may deny a data flow, send an acknowledgement to a create message or create acknowledge message, create the state for the session according to the filter, or refer the sender to an appropriate PDP using a PDP redirect message. When the session state creation is refused or redirected, the create message or packet may be dropped. Alternatively, when the state is created, the create message or packet may be forwarded from the PDP to its destination, at the risk of forwarding a plurality of copies, for instance from the sender node and the PDP, to the destination. In another embodiment, the create message may be dropped by the PDP when a new state is created, which increases setup latency. However, successive create packets that do not alter session state may passed to the destination, which reduces the number of transported copies, but increases delay for policy devices along the path. The update messages may be handled similar to the create message using the FCON, which may be used to replace or update existing states.

In an embodiment, when a host discovers a PDP on a particular path, it may then directly signal the PDP. Further, the packets that are sent between the same source and destination addresses as those of the data session may travel a different path to the actual data stream, for example due to load balancing. In such a case, the PDP that receives the create or update message may send a PDP redirect message to refer the source to another appropriate PDP for the data flows.

Figure 27:
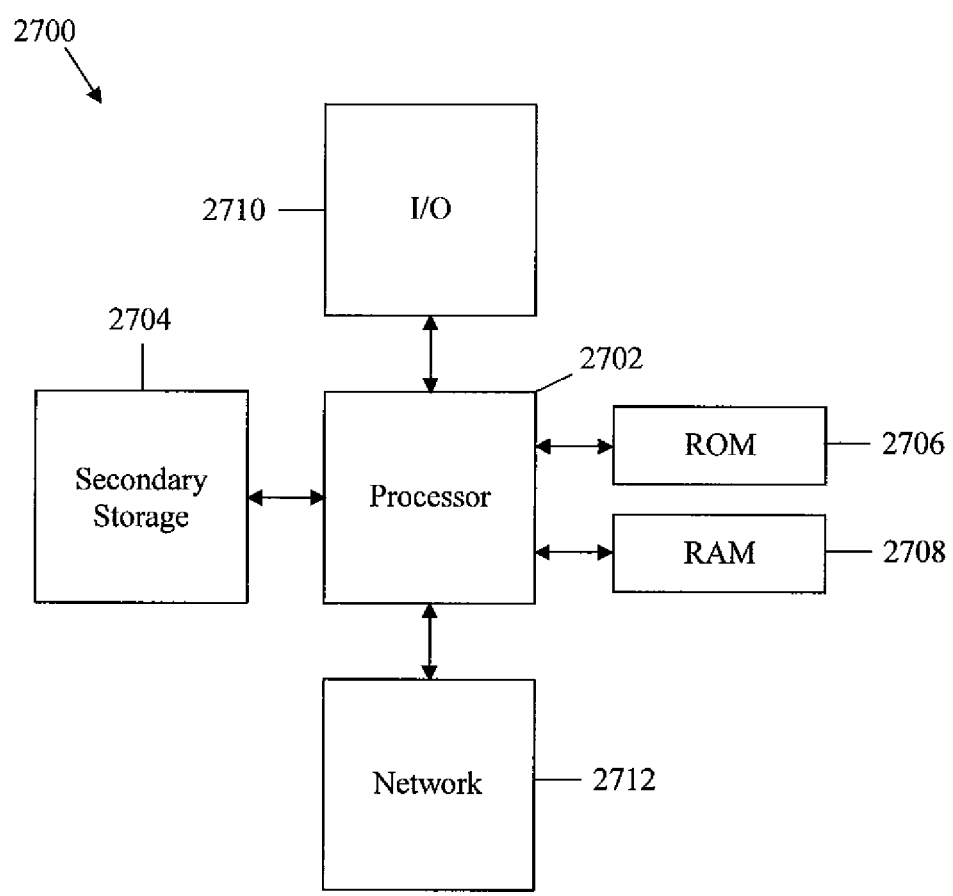
FIG. 27 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 27 illustrates a typical, general-purpose network component 2700 suitable for implementing one or more embodiments of the components disclosed herein. The network component 2700 includes a processor 2702 (which may be referred to as a central processor unit or CPU) that is in communication with memory devices including secondary storage 2704, read only memory (ROM) 2706, random access memory (RAM) 2708, input/output (I/O) devices 2710, and network connectivity devices 2712. The processor 2702 may be implemented as one or more CPU chips, or may be part of one or more application specific integrated circuits (ASICs).

The secondary storage 2704 is typically comprised of one or more disk drives or tape drives and is used for non-volatile storage of data and as an over-flow data storage device if RAM 2708 is not large enough to hold all working data. Secondary storage 2704 may be used to store programs that are loaded into RAM 2708 when such programs are selected for execution. The ROM 2706 is used to store instructions and perhaps data that are read during program execution. ROM 2706 is a non-volatile memory device that typically has a small memory capacity relative to the larger memory capacity of secondary storage 2704. The RAM 2708 is used to store volatile data and perhaps to store instructions. Access to both ROM 2706 and RAM 2708 is typically faster than to secondary storage 2704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one memory; and
   at least one processor coupled to the memory, the processor configured to:
      act as a policy decision point (PDP) that manages a firewall, wherein the firewall controls communications entering or leaving a network;
      receive a request to modify a firewall policy entry, wherein the request is received from an interior node that is positioned inside the network;
      authenticate the interior node;
      manage the firewall according to the request using a firewall control protocol; and
      send a reply to the interior node regarding the request,
   wherein the request comprises:
      a request message comprising a Session Identifier (Id), a Reserved field, and a Message Id, and at least one firewall policy option; or
      an initiation message to establish a secure association with the interior node comprising a Session Id, a Secure (Sec) Mode, a Reserved field, a Message Id, and at least one firewall policy option.

2. The network component of claim 1, wherein the firewall policy option comprises a Dynamic Host Configuration Protocol (DHCP) option comprising an OPTION_FC_PDP, an option-len, and a plurality of PDP Sub-options, and wherein the PDP Sub-option comprises a DHCP sub-option comprising a PDP-SOPT, a Prefixes field, a suboption-len, a PDP IP Address, at least one Prefix, and at least one PrefixLen.

3. The network component of claim 1, wherein the firewall policy option comprises:
   an acknowledgement option comprising a Type, a Length, a Status, and a Reserved field; or
   a flow identifier option comprising a Type, a Length, an Index, an Action, a Format, a Priority (PRI), a Reserved field, and a Flow Descriptor; or
   the acknowledgement option and the flow identifier option.

4. The network component of claim 1, wherein the firewall policy option comprises:
   a nonce option comprising a Type, a Length, and a nonce; or
   a timestamp option comprising a Type, a Length, a Reserved field, and a Timestamp; or
   the nonce option and the timestamp option.

5. The network component of claim 1, wherein the firewall policy option comprises:
   an Internet Protocol (IP) address option comprising a Type, a Length, a Padding Length (PadLen), at least one Protocol, at least one Interior Port, at least one Exterior Ports, at least one Interior Address, and at least one Exterior Address; or
   a cookie option comprising a Type, a Length, a Certificate Path Discovery (C) field, a Reserved field, and a Cookie; or
   the IP address option and the cookie option.

6. The network component of claim 1, wherein the firewall policy option comprises:
   a Public Key option comprising a Type, a Length, a Key Type, a Pad Length, a Public Key Information, and a Padding; or
   a lifetime option comprising a Type, a Length, a Reserved field, and a Time; or
   the Public Key option and the lifetime option.

7. The network component of claim 1, wherein the firewall policy option comprises:
   a certificate option comprising a Type, a Length, a Certificate (Cert) Type, a Reserved field, a Certificate, and a Padding; or
   a digital signature option comprising a Type, a Length, a Sign Type, a Pad Length, a Key Hash, a Digital Signature, and a Padding; or
   the certificate option and the digital signature option.

8. A network component comprising:
   at least one memory; and
   at least one processor coupled to the memory, the processor configured to:
   act as a policy decision point (PDP) that manages a firewall, wherein the firewall controls communications entering or leaving a network;
   receive a request to modify a firewall policy entry, wherein the request is received from an interior node that is positioned inside the network;
   authenticate the interior node;
   manage the firewall according to the request using a firewall control protocol; and send a reply to the interior node regarding the request,
   wherein the reply comprises:
   a response message comprising a Session Identifier (Id), a Reserved field, and a Message Id; or
   an initiation acknowledgement message comprising a Session Id and a Message Id that match corresponding fields in the received request, a Secure (Sec) Mode, and a Status field; or
   the response message and the initiation acknowledgement message.

9. The network component of claim 8, wherein the request to modify a firewall policy entry is not initiated by a system administrator.

10. The network component of claim 8, wherein the PDP is positioned inside the network.

11. A method comprising:
    implementing a policy decision point (PDP) that manages a firewall, wherein the firewall controls communications entering or leaving a network;
    receiving a request to modify a firewall policy entry, wherein the request is received from an interior node that is positioned inside the network and inside the firewall;
    authenticating the interior node;
    managing the firewall according to the request using a firewall control protocol; and
    sending a reply to the interior node regarding the request, wherein the request comprises:
    a request message comprising a Session Identifier (Id), a Reserved field, and a Message Id, and at least one firewall policy option; or
    an initiation message to establish a secure association with the interior node comprising a Session Id, a Secure (Sec) Mode, a Reserved field, a Message Id, and at least one firewall policy option.

12. The method of claim 11, wherein the firewall policy option is received from an exterior node or end node via the interior node.

13. The method of claim 11, wherein the firewall policy option is received using a firewall control for public access networks (FCON) protocol.

14. The method of claim 11, wherein managing the firewall according to the request comprises creating, adding, modifying, updating, or deleting at least one firewall policy entry in the PDP or signaling a policy enforcement point (PEP) to create, add, modify, update, or delete at least one firewall policy entry, and wherein the entry is associated with an application, protocol, address, traffic filter, other resources, or combinations thereof.

15. The method of claim 11 further comprising signaling a network address translator (NAT) coupled to the PDP, wherein the NAT is configured to allocate an address, port, or both to the node.

16. The method of claim 15, wherein the NAT is located in a node, and wherein a policy enforcement point (PEP) is located in the same node.

17. The method of claim 11 further comprising:
    receiving a signal from the interior node requesting the establishment a session associated with a source address and a requested protocol; and
    sending an indication to the interior node when the session is allowed.

18. The method of claim 17, wherein the address of the PDP is obtained by the interior node before signaling via a router advertisement option or a Dynamic Host Configuration Protocol (DHCP) option.

19. The method of claim 17 further comprising signaling a second PDP to establish the session with the requested protocol.

20. The method of claim 11, wherein authenticating the interior node comprises verifying a signaling credential associated with a source address.

21. The method of claim 20, wherein the signaling credential comprises a public key, a certificate, a digital signature, a Cryptographically Generated Addresses (CGA), or combinations thereof.

* * * * *